US010182280B2

(12) United States Patent
Kishimoto et al.

(10) Patent No.: US 10,182,280 B2
(45) Date of Patent: *Jan. 15, 2019

(54) SOUND PROCESSING APPARATUS, SOUND PROCESSING SYSTEM AND SOUND PROCESSING METHOD

(71) Applicant: PANASONIC INTELLECTUAL PROPERTY MANAGEMENT CO., LTD., Osaka (JP)

(72) Inventors: Michinori Kishimoto, Fukuoka (JP); Yoshiyuki Watanabe, Fukuoka (JP); Makoto Takakuwa, Fukuoka (JP); Manabu Nakamura, Fukuoka (JP); Hideki Shuto, Fukuoka (JP); Kenji Tamura, Fukuoka (JP); Ryuji Yamazaki, Kanagawa (JP); Norio Saitou, Fukuoka (JP); Akihiro Akiyama, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/259,664

(22) Filed: Apr. 23, 2014

(65) Prior Publication Data
US 2015/0312662 A1 Oct. 29, 2015

(51) Int. Cl.
H04R 3/00 (2006.01)
H04R 5/00 (2006.01)
(Continued)

(52) U.S. Cl.
CPC ............... *H04R 1/08* (2013.01); *H04R 3/005* (2013.01); *G06K 9/00771* (2013.01);
(Continued)

(58) Field of Classification Search
CPC .......................... H04R 2430/23; H04R 3/005; H04R 2499/15; H04R 29/005
(Continued)

(56) References Cited

U.S. PATENT DOCUMENTS

| 4,559,642 A | 12/1985 | Miyaji et al. |
| 5,523,783 A | 6/1996 | Cho |

(Continued)

FOREIGN PATENT DOCUMENTS

| JP | 5-174147 | 7/1993 |
| JP | 6-133189 | 5/1994 |

(Continued)

OTHER PUBLICATIONS

Extended European Search Report in EP Application No. 14165758.5, dated Nov. 11, 2014.
(Continued)

*Primary Examiner* — George C Monikang
(74) *Attorney, Agent, or Firm* — Greenblum & Bernstein, P.L.C.

(57) ABSTRACT

A sound processing apparatus includes a processor to obtain sound data and image data, wherein the sound data is collected from a sound source in a given area by a sound collection unit including a plurality of microphones and the image data is captured by an imaging unit which captures an image at least partially in the given area, to designate a direction defined relative to the sound collection unit, wherein the designated direction corresponds to a designation part on an image displayed based on the image data, to designate an arbitrary range in the given area, wherein the designated arbitrary range corresponds to a designation part on the image displayed based on the image data, and to emphasize a sound component in the sound data in the
(Continued)

direction designated by the first designation unit within the arbitrary range designated by the second designation unit.

27 Claims, 10 Drawing Sheets

(51) Int. Cl.
*H04R 1/08* (2006.01)
*G06K 9/00* (2006.01)
*H04R 27/00* (2006.01)
*G08B 13/196* (2006.01)

(52) U.S. Cl.
CPC ........ *G08B 13/19619* (2013.01); *H04R 27/00* (2013.01); *H04R 2201/401* (2013.01); *H04R 2227/003* (2013.01); *H04R 2420/07* (2013.01)

(58) Field of Classification Search
USPC .......................................... 381/26, 92, 122
See application file for complete search history.

(56) References Cited

U.S. PATENT DOCUMENTS

| | | | |
|---|---|---|---|
| 7,852,369 | B2 | 12/2010 | Cutler et al. |
| 8,098,832 | B2 | 1/2012 | Lin |
| 2004/0001137 | A1 | 1/2004 | Cutler et al. |
| 2004/0066941 | A1 | 4/2004 | Amada et al. |
| 2005/0228665 | A1 | 10/2005 | Kobayashi et al. |
| 2006/0204012 | A1 | 9/2006 | Marks et al. |
| 2008/0247567 | A1 | 10/2008 | Kjolerbakken et al. |
| 2008/0267282 | A1* | 10/2008 | Kalipatnapu ....... H04L 12/1822 348/14.08 |
| 2009/0210226 | A1* | 8/2009 | Ma .......................... G10L 15/26 704/236 |
| 2010/0254543 | A1 | 10/2010 | Kjoelerbakken |
| 2010/0302401 | A1* | 12/2010 | Oku .................... H04N 5/23293 348/222.1 |
| 2010/0303298 | A1 | 12/2010 | Marks et al. |
| 2012/0046101 | A1 | 2/2012 | Marks et al. |

FOREIGN PATENT DOCUMENTS

| | | |
|---|---|---|
| JP | 2003-348569 | 12/2003 |
| JP | 2004-32782 | 1/2004 |
| JP | 2004-109361 | 4/2004 |
| JP | 2004-153764 | 5/2004 |
| JP | 2004153754 A | 5/2004 |
| JP | 2006-238110 | 9/2006 |
| JP | 2006-339741 | 12/2006 |
| JP | 2007-228459 | 9/2007 |
| JP | 2007-300220 | 11/2007 |
| JP | 2008-219227 | 9/2008 |
| JP | 2008-271157 | 11/2008 |
| JP | 2009-130767 | 6/2009 |
| JP | 2013-240000 | 11/2013 |
| WO | 98/47291 | 10/1998 |
| WO | 2008/016360 | 2/2008 |

OTHER PUBLICATIONS

International Search Report in PCT/JP2014/002334, dated Jul. 29, 2014.
U.S. Appl. No. 14/228,716 to Michinori Kishimoto et al., filed Mar. 28, 2014.
Chinese Office Action in CN Application No. 201480044955.5, dated Feb. 5, 2018.

* cited by examiner

SOUND PROCESSING APPARATUS, SOUND PROCESSING SYSTEM AND SOUND PROCESSING METHOD

BACKGROUND

1. Field of the Invention

The present invention relates to a sound processing apparatus, a sound processing system and a sound processing method.

2. Description of the Related Art

In a related art, monitoring systems have been utilized for monitoring conditions in plants, stores, and public places, for example, from specific rooms or from remote locations. Such a monitoring system is provided with a camera for capturing images, a microphone for collecting sounds, and a recorder device for storing predetermined data (for example, the captured images and the collected sounds), for example. By using the monitoring system and reproducing the past data, which is recorded by the recorder device when an event or an accident occurs, for example, it is possible to effectively use the stored images or sound for becoming aware of a situation that happens in the past.

As a monitoring system in the related art, a system for an omnidirectional camera and a microphone array has been known. The system extracts sound only from a specific direction by utilizing array microphones formed by a plurality of microphones and by performing filtering, and forms a beam, or sound-collecting beam. See JP-A-2004-32782, for example.

SUMMARY

There is a possibility that various types of advantageous information are included in sound data collected by using the array microphones. The monitoring system disclosed in JP-A-2004-32782 insufficiently uses sound data and image data, and it is expected to improve convenience for a user who uses the monitoring system.

The present invention provides a sound processing apparatus, a sound processing system and a sound processing method capable of promoting usage of sound data and image data and improving convenience.

A sound processing apparatus according to an aspect of the present invention includes: a data obtaining unit, configured to obtain sound data and image data, wherein the sound data is collected from a sound source in a given area by a sound collection unit including a plurality of microphones and the image data is captured by an imaging unit which captures an image at least partially in the given area; a first designation unit, configured to designate a direction defined relative to the sound collection unit, wherein the designated direction corresponds to a designation part on an image displayed based on the image data; a second designation unit, configured to designate an arbitrary range in the given area, wherein the designated arbitrary range corresponds to a designation part on the image displayed based on the image data; and a directivity processing unit, configured to emphasize a sound component in the sound data in the direction designated by the first designation unit within the arbitrary range designated by the second designation unit.

A sound processing system according to another aspect of the present invention includes: a sound collection apparatus which includes a sound collection unit configured to collect sound from a sound source in a given area by using a plurality of microphones; an imaging apparatus which includes an imaging unit configured to capture image at least partially in the given area; and a sound processing apparatus, configured to process sound data collected by the sound collection unit, wherein the sound processing apparatus includes: a data obtaining unit, configured to obtain the sound data collected by the sound collection unit and image data captured by the imaging unit; a first designation unit, configured to designate a direction defined relative to the sound collection unit, wherein the designated direction corresponds to a designation part on an image displayed based on the image data; a second designation unit, configured to designate an arbitrary range in the given area, wherein the designated arbitrary range corresponds to a designation part on the image displayed based on the image data; and a directivity processing unit, configured to emphasize a sound component in the sound data in the direction designated by the first designation unit within the arbitrary range designated by the second designation unit.

A sound processing method according to still another aspect of the present invention is a sound processing method performed by a sound processing apparatus including: obtaining sound data and image data, wherein the sound data is collected from a sound source in a given area by a sound collection unit including a plurality of microphones and the image data is captured by an imaging unit which captures an image at least partially in the given area; designating a direction defined relative to the sound collection unit, wherein the designated direction corresponds to a designation part on an image displayed based on the image data; designating an arbitrary range in the given area, wherein the designated arbitrary range corresponds to a designation part on the image displayed based on the image data; and emphasizing a sound component in the sound data in the designated direction within the designated arbitrary range.

According to the present invention, it is possible to promote usage of sound data and image data and improve convenience.

DETAILED DESCRIPTION

Hereinafter, a description will be given of embodiments of the present invention with reference to accompanying drawings.

First Embodiment

Figure 1:
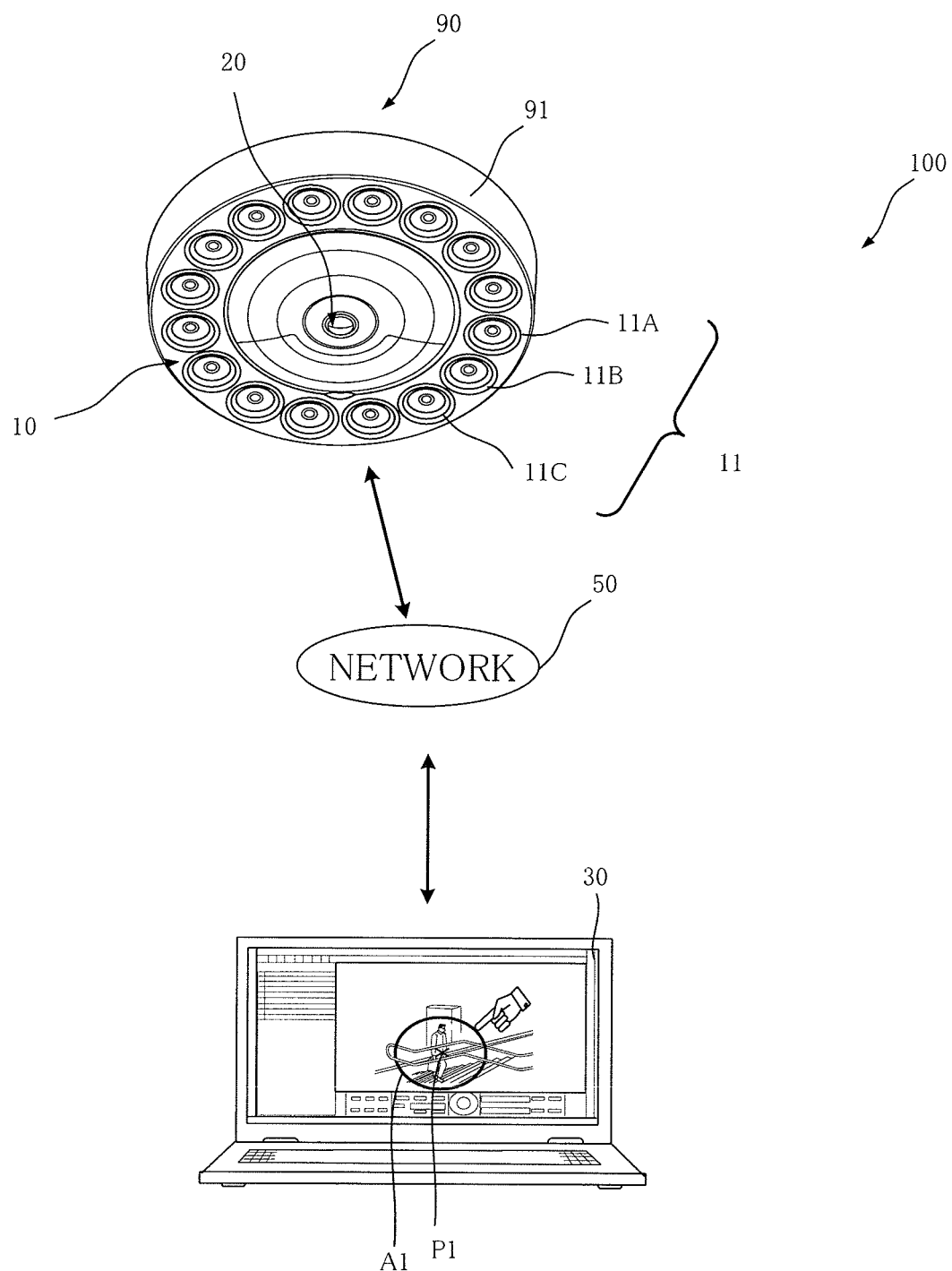
FIG. 1 is an outline diagram of a monitoring system according to a first embodiment.

FIG. 1 is an outline diagram of a monitoring system 100 according to a first embodiment. In the monitoring system 100, array microphones 10, a camera 20, and a monitoring control apparatus 30 are connected to each other via a wired or wireless network 50.

The array microphones 10 is an example of a sound collection unit and a sound collection apparatus. The camera 20 is an example of an imaging unit and an imaging apparatus. The monitoring control apparatus 30 is an example of a sound processing apparatus. The monitoring system 100 is an example of a sound processing system.

The array microphones 10 includes a plurality of microphones 11 (11A, 11B, 11C, ... ) to collect sound in the circumference of the array microphones 10, in other words, to collect sound from a sound source within a predetermined area, and obtain sound data. The camera 20 captures images at least partially in the predetermined area which can be captured by the camera 20 and obtains image data. The image data includes moving images or stationary images, for example. The monitoring control apparatus 30 performs various types of processing in relation to monitoring in accordance with a result of sound collection by the array microphones 10 and a result of image capturing by the camera 20.

In the monitoring system 100, a camera 20 and sixteen microphones 11 (11A, 11B, 11C, ... ) included in the array microphones 10 are integrally embedded in a unit case body 91 and form a sound collection unit 90. The number of microphones in the array microphones 10 may be equal to or less than 15 or equal to or more than 17. Alternatively, the array microphones 10 and the camera 20 may be separately formed without forming the sound collection unit 90.

The camera 20 is arranged at substantially the center of the unit case body 91 while the center in an imaging direction (optical axis direction) is directed downward in the vertical direction. The plurality of microphones 11 in the array microphones 10 are arranged on a circular circumference at a predetermined interval so as to surround the circumference of the camera 20 along an installation surface of the unit case body 91. The plurality of microphones 11 may be arranged on a rectangular shape, for example, instead of the circular circumference. In addition, such arrangement relationship and arrangement shapes of the camera 20 and the plurality of microphones 11 are described for illustrative purposes, and other arrangement relationship and arrangement shapes may be employed.

For example, the camera 20 is configured to image an object in a wide range (in all directions, for example) at the same time. For example, the respective microphones 11 are configured to detect sound waves spanning from a wide range (from all directions, for example).

Figure 2:
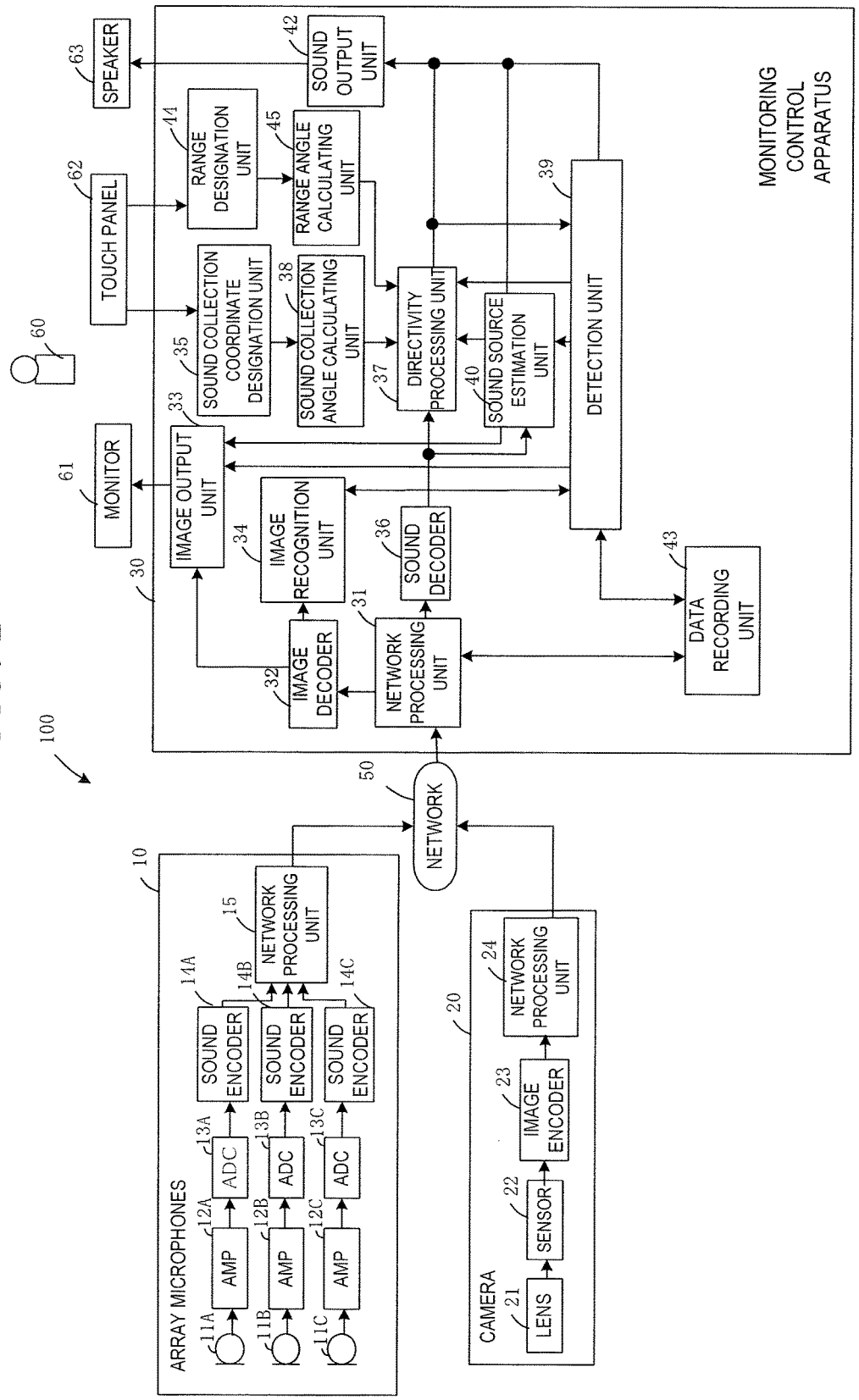
FIG. 2 is a block diagram of a configuration example of the monitoring system according to the first embodiment.

FIG. 2 is a block diagram showing a configuration example of the monitoring system 100.

The monitoring system 100 includes the array microphones 10, the camera 20, and the monitoring control apparatus 30. The array microphones 10, the camera 20, and the monitoring control apparatus 30 are connected to each other via the network 50 so as to communicate data therebetween. In addition, a monitor 61, a touch panel 62, and a speaker 63, for example, are connected to the monitoring control apparatus 30.

The configuration in FIG. 2 is made on the assumption of a case where the monitoring control apparatus 30 records image data and sound data for monitoring images and sound in real time. In addition, the camera 20 may record the image data, the array microphones 10 may record the sound data, and the image data and the sound data after the recording may be checked as references.

The following description will be given of the representative three microphones 11A, 11B, and 11C among the plurality of microphones 11 included in the array microphones 10. The microphones other than the three microphones 11A to 11C have the same configurations and functions as those of the microphones 11A to 11C.

The array microphones 10 is formed such that the plurality of microphones 11A, 11B, and 11C are aligned regularly (on a circular circumference, for example) in a mutually adjacent state. The microphones 11A to 11C are converters which convert sound into electric signals (sound data). In the array microphones 10, the microphones 11A, 11B, and 11C may not be arranged regularly. In such a case, information on positions of the respective microphones 11A to 11C may be held in the monitoring system 100, for example, and the directivity processing may be performed.

Amplifiers (AMP) 12A to 12C, A/D converters (ADC: Analog to Digital Converters) 13A to 13C, and sound encoders 14A to 14C are connected to outputs of the microphones 11A to 11C. In addition, a network processing unit 15 is connected to outputs of the sound encoders 14A to 14C.

The microphones 11A to 11C generate sound data in accordance with acoustic vibration input from various directions. The sound data is analog sound data. The amplifiers 12A to 12C amplify the sound data output from the microphones 11A to 11C. The A/D converters (ADCs) 13A to 13C periodically sample the sound data output from the amplifiers 12A to 12C and convert the sound data into digital data. The sound encoders 14A to 14C encode the sound data (time-series variations in waveforms of the sound data) output from the A/D converters 13A to 13C and generate sound data in a predetermined format which is suitable for delivery.

In addition, the "sound" in this embodiment may include general sound components or noise components generated by mechanical vibration, for example, as well as sound obtained by human voice production. In addition, the "sound" may include sound other than a monitoring-target sound. That is, signals of the sound components collected by the microphones 11A to 11c will be described as "sound" without distinguishing the types of the sound components, in some cases.

The network processing unit 15 obtains the sound data generated by the sound encoders 14A to 14C and sends the sound data to the network 50. For example, the sound encoders 14A to 14C generate independent sound data from sound collected by the microphones 11A to 11c. Accordingly, the network processing unit 15 sends sound data of a plurality of channels corresponding to the respective microphones 11A to 11C to the network 50.

The camera 20 is provided with a lens 21, a sensor 22, an image encoder 23, and a network processing unit 24.

The lens 21 is an omnidirectional lens or a fisheye lens, for example. The sensor 22 is an imaging device and includes a Charge Coupled Device (CCD) image sensor or a Complementary Metal Oxide Semiconductor (CMOS) image sensor. The sensor 22 generates image data in accordance with an optical image of an object which is incident on an imaging surface of the sensor 22 via the lens 21.

The image encoder 23 sequentially processes the image data output from the sensor 22 and generates image data which is compatible with a predetermined standard. The network processing unit 24 sends the image data generated by the image encoder 23 to the network 50.

Figure 9A:
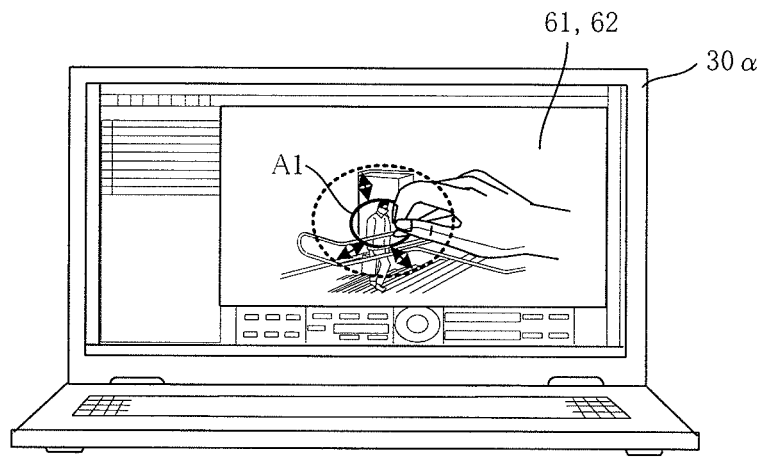
FIGS. 9A and 9B are schematic diagrams showing examples of change in size of a sound collection range by using a personal computer (PC) according to the first embodiment.
Figure 9B:
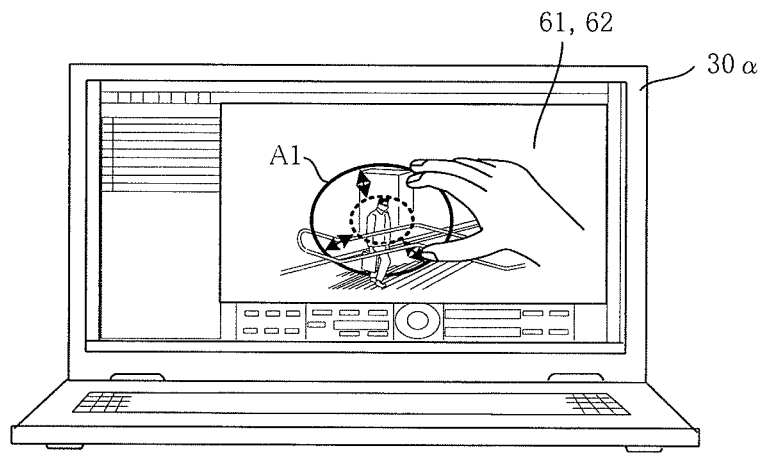
Figure 9C:
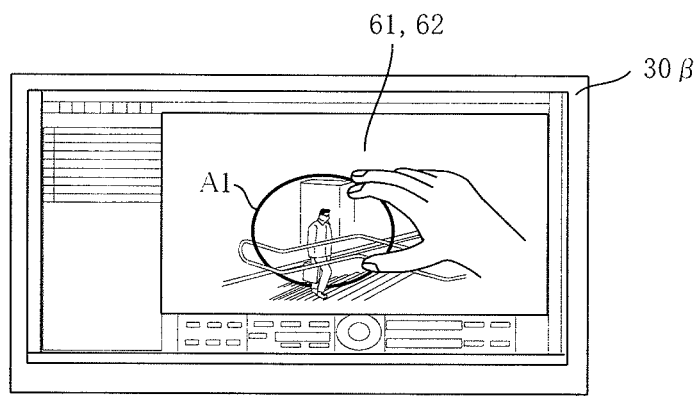
FIG. 9C is a schematic diagram showing an example of change in size of a sound collection range by using a tablet terminal according to the first embodiment.

The monitoring control apparatus 30 is implemented by a Personal Computer (PC) 30a (see FIGS. 9A and 9B), for example. Alternatively, the monitoring control apparatus 30 may be implemented by a tablet terminal 30b (see FIG. 9C). The monitoring control apparatus 30 includes a Central Processing Unit (CPU) or a Digital Signal Processor (DSP), for example. The monitoring control apparatus 30 includes a Read Only Memory (ROM) or a Random Access Memory (RAM), for example.

The monitoring control apparatus 30 realizes various functions by causing the CPU or the DSP to execute a control program (for example, an application program or a program in the form of ActiveX) recorded in the ROM or the RAM. The ROM or the RAM forms a memory which is not shown in the drawing.

The monitoring control apparatus 30 is provided with a network processing unit 31, an image decoder 32, an image output unit 33, an image recognition unit 34, a sound collection coordinate designation unit 35, a range designation unit 44, a sound decoder 36, and a directivity processing unit 37. In addition, the monitoring control apparatus 30 is provided with a sound collection angle calculating unit 38, a range angle calculating unit 45, a detection unit 39, a sound source estimation unit 40, a sound output unit 42, and a data recording unit 43.

The network processing unit 31 communicates data with the array microphones 10 and the camera 20 via the network 50. Through the data communication, the network processing unit 31 obtains sound data of a plurality of channels from the array microphones 10 and obtains image data from the camera 20. The network processing unit 31 is an example of a data obtaining unit.

The network processing unit 31 may obtain the sound data sent from the array microphones 10 and the image data sent from the camera 20 directly from the array microphones 10 and the camera 20. The network processing unit 31 may read and obtain the sound data or the image data (at least the sound data) recorded in the data recording unit 43 from the data recording unit 43 at any timing. The network processing unit 31 may cause the data recording unit 43 to record the sound data or the image data obtained directly from the array microphones 10 and the camera 20 at any timing.

The image decoder 32 decodes the image data from the network processing unit 31 and generates reproducible image data.

The image output unit 33 converts the image data from the image decoder 32 into image data in the form in which the monitor 61 can display the image data, and sends the image data to the monitor 61. In addition, the image output unit 33 may control the display by the monitor 61. Moreover, the image output unit 33 may send image data in accordance with detection information from the detection unit 39 to the monitor 61.

The monitor 61 displays various types of image data. The monitor 61 displays an image in accordance with the image data from the image output unit 33, for example. For example, an image captured by the camera 20 is displayed on the monitor 61. The monitor 61 is an example of an informing unit.

The image recognition unit 34 executes predetermined image processing on the image data from the image output unit 33, and may recognize whether or not the image data coincides with images in various patterns registered in advance in the memory which is not shown in the drawing, for example. The image recognition unit 34 executes pattern matching processing and extracts a pattern which is similar to a predetermined person or to a face of the predetermined person among various physical objects included in the image, for example. A pattern of a physical object other than a person may be extracted.

In addition, the image recognition unit 34 may specify a type of a physical object included in the image data (a male or a female person, for example), for example. Moreover, the image recognition unit 34 may have a Video Motion Director (VMD) function and detect a motion in the image data.

The sound collection coordinate designation unit 35 receives an input from the touch panel 62 or the image recognition unit 34, for example, and derives a coordinate corresponding to a reference position (e.g., a center position) of an input position or an input range. For example, the sound collection coordinate designation unit 35 receives coordinates of a position (the reference sign P1 in FIG. 1, for example) which an operator 60 is to pay attention in the image displayed on the screen of the monitor 61, as a sound collection coordinate (x, y). The sound collection coordinate designation unit 35 is an example of a first designation unit which designates a direction defined relative to the sound collection unit (the array microphones 10, for example), the designated direction corresponding to a designation part (e.g., a sound collection coordinate) on an image displayed based on image data.

The operator 60 operates the touch panel 62 while viewing the monitor 61. The operator 60 can change the sound collection coordinates in a display range on the screen by moving a position of a pointer (not shown) displayed on the screen along with the moving operation (dragging operation, for example) on the touch panel 62. Coordinates of the pointer is provided as sound collection coordinates to the sound collection coordinate designation unit 35 by a touch operation performed by the operator 60 on the touch panel 62. The operator 60 is an example of an observer who performs monitoring by using the monitoring system 100.

The range designation unit 44 receives an input, for example, from the touch panel 62, and derives a coordinate corresponding to an input range and a size of the input range. For example, the range designation unit 44 receives coordinates of a range, which the operator 60 is to pay attention in the image displayed on the screen of the monitor 61, as a sound collection range A1, and also derives a size of the sound collection range A1. The range designation unit 44 is an example of a second designation unit which designates an arbitrary range in the predetermined (given) area, the designated arbitrary range corresponding to a designation part (e.g., a sound collection range A1) on the image displayed based on the image data.

The range designation unit 44 may designate the sound collection range A1 and designate (or derive) the size of the sound collection range A1, for example, by an operation in which the sound collection range A1 is designated by multiple fingers at the same time on the screen of the touch panel 62. For example, the sound collection range A1 and the size of the sound collection range A1 may be designated and derived by a pinch-in operation (see FIG. 9A, for example) or a pinch-out operation (see FIG. 9B, for example) on the screen of the touch panel 62. The range contained in the screen is an example of a predetermined (given) area, and the sound collection range A1 is an example of an arbitrary range. Designating a size of the sound collection range A1 may be simply referred to as designating the sound collection range A1. The pinch-in operation is an example of an operation of reducing the size of the sound collection range A1, and the pinch-out operation is an example of an operation of increasing the size of the sound collection range A1.

The range designation unit 44 may designate, for example, a range of a circular shape or an elliptical shape with a diameter or major (minor) axis defined by positions touched with two fingers, as the sound collection range A1 and designate (or derive) the size of the sound collection range A1. The range designation unit 44 may designate, for example, a range of a polygonal shape with a diagonal defined by positions touched with two fingers, as the sound collection range A1 and designate (or derive) the size of the sound collection range A1. The range designation unit 44 may designate, for example, a range of a complicated shape with a contour points defined by positions touched with three or more fingers, as the sound collection range A1 and designate (or derive) the size of the sound collection range A1. For example, the shape of the sound collection range A1 may be predetermined in advance and be stored in a memory which is not illustrated. Alternatively, the range designation unit 44 may derive the sound collection range A1 and the size of the sound collection range A1 by designating a plurality of positions in time difference with a single finger on the screen of the touch panel 62, and the sound collection range A1 is defined by the plurality of designated positions.

When a relation is predetermined in advance between the sound collection coordinate and the sound collection range A1, the sound collection range A1 or the sound collection coordinate may be designated in accordance with the predetermined relation. For example, when the sound collection coordinate is designated, the sound collection range A1 and the size of the sound collection range A1 may be derived with a given shape while centering the sound collection coordinate. For example, when a plurality of points which defines a contour of the sound collection range A1 is designated, the size of the sound collection range A1 may be derived and the coordinate of the center position of the sound collection range A1 may be designated as the sound collection coordinate.

The sound collection coordinate or the size of the sound collection range A1 may be designated by using an input tool other than the touch panel 62. For example, a mouse may be connected to the monitoring control apparatus, and the operator 60 may touch a desired image range by using the mouse. Alternatively, the sound collection coordinate or the size of the sound collection range A1 may be designated by touching the touch panel 62 with an input tool (e.g., by a stylus pen) other than the finger.

In addition, when the image recognition unit 34 recognizes that a pattern registered in advance is included in the image data, the image recognition unit 34 may provide a coordinate of a position, at which the recognized pattern is present, on the monitor 61 (the reference sign P1 in FIG. 1, for example) as sound collection coordinates to the sound collection coordinate designation unit 35. The recognized patterns include an entirety of person or a face of person, for example.

In addition, when the image recognition unit 34 recognizes that a pattern registered in advance is included in the image data, the image recognition unit 34 may provide information on the size of the sound collection range A1, which is defined by a range, at which the recognized pattern is present, on the monitor 61 to the range designation unit 44. The recognized pattern includes an entirety of person or a face of person, for example.

The sound data of the plurality of channels from the network processing unit 15 is input to the sound decoder 36, and the sound decoder 36 decodes the sound data. In addition, sound decoders may be provided for processing sound data of a plurality of channels independently as the sound decoder 36. In such a case, it is possible to process the sound data of the plurality of channels collected by the respective microphones 11A to 11C in the array microphones 10 at the same time.

The sound collection angle calculating unit 38 derives (calculates, for example) a sound collection angle $\theta 1$ which represents a direction of the directivity of the array microphones 10 based on the sound collection coordinates determined by the sound collection coordinate designation unit 35. The sound collection angle $\theta 1$ derived by the sound collection angle calculating unit 38 is input as a parameter of the directivity processing unit 37. For example, the sound collection coordinates and the sound collection angle $\theta 1$ have one-to-one correspondence, and a conversion table including such correspondence information may be stored in the memory, which is not shown in the drawing. The sound collection angle calculating unit 38 may derive the sound collection angle $\theta 1$ with reference to the conversion table.

The range angle calculating unit 45 derives (or calculates) a range angle $\theta 2$ which indicates a size (an expansion of the directivity or a strength of the directivity) of the range of the directivity of the array microphones 10 based on the size of the sound collection range A1 determined by the range designation unit 44. The range angle $\theta 2$ derived by the range angle calculating unit 45 is input as a parameter of the directivity processing unit 37. For example, the size of the sound collection range A1 can be associated with the range angle $\theta 2$ on a one-on-one basis, and a conversion table including information of the association may be stored in a memory which is not illustrated. The range angle calculating unit 45 may refer to the conversion table and derive the range angle $\theta 2$.

Figure 10A:
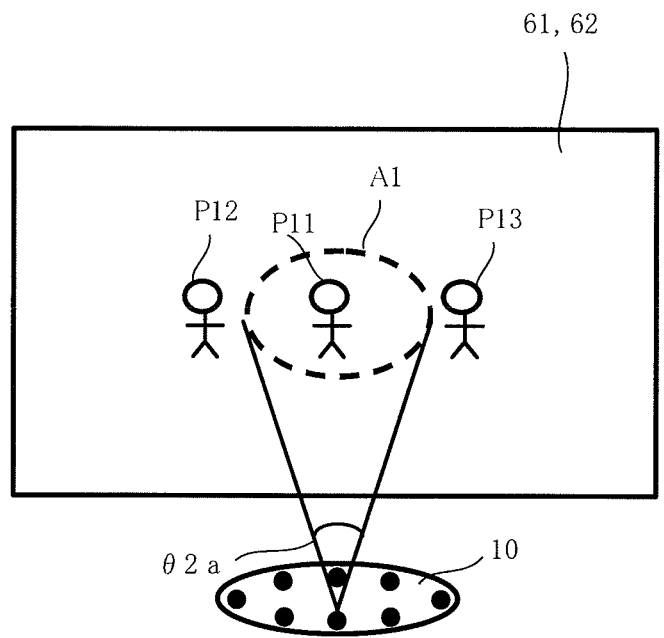
FIGS. 10A and 10B are schematic diagrams showing examples of sound collection range and sound collection angle according to the first embodiment.
Figure 10B:
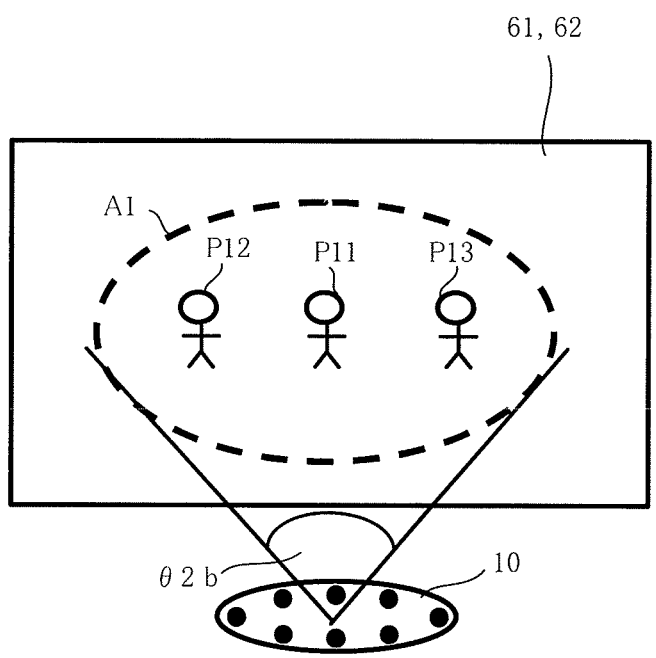

The relation between the size of the sound collection range A1 and the range angle $\theta 2$ will be described in detail. FIGS. 10A and 10B are schematic diagrams showing examples of sound collection range and sound collection angle.

FIG. 10A shows a range angle $\theta 2a$ as an example of the range angle $\theta 2$ in a case where the sound collection range A1 is relatively small (or narrow). In FIG. 10A, a range including a direction of a person P11 who is located in a center of the monitor 61 and excluding directions of persons P12 and P13 is designated as the sound collection range A1. In this case, it is possible to collect the sound from the person P11 in the center when the three persons are talking with each other in the state of FIG. 10A. Accordingly, the privacy of the persons P12 and P13 is protected.

FIG. 10B shows a range angle θ2b as an example of the range angle θ2 in a case where the sound collection range A1 is relatively large (or wide). In FIG. 10B, a range including directions of persons P11 to P13 who are displayed on the monitor 61 is designated as the sound collection range A1. In this case, it is possible to collect the sound from the persons P11 to P13 when the three persons P11 to P13 are talking with each other in the state of FIG. 10B. Accordingly, a monitoring accuracy is improved in the area displayed on the monitor 61, thereby ensuring a security.

The directivity processing unit 37 obtains information on the sound collection angle θ1 from the sound collection angle calculating unit 38, the range angle θ2 from the range angle calculating unit 45 and the sound data from the sound decoder 36. The directivity processing unit 37 synthesizes the sound data of the plurality of channels output from the sound decoder 36 in accordance with the sound collection angle θ1 and the range angle θ2 based on a predetermined algorithm and forms directivity (directivity processing).

For example, the directivity processing unit 37 raises a signal level of a sound component in a direction (a direction of the directivity) and a range (a range of the directivity) of a location (focused point) at which a monitoring-target person is present and lowers signal levels of sound components in the other directions. The directivity processing unit 37 outputs the sound data items subjected to the directivity processing to the detection unit 39 and the sound output unit 42.

The directivity processing unit 37 performs the directivity processing in accordance with the range angle θ2, for example, in a known method. For example, the directivity processing unit 37 may determine the number of channels of the sound data used for the directivity processing, namely, the number of microphones 11 through which the sounds are collected, in accordance with the range angle θ2. For example, the directivity processing unit 37 may increase the number of channels of the sound data since the directivity is strengthened as the range angle θ2 is small. For example, the directivity processing unit 37 may decrease the number of channels of the sound data since the directivity is weakened as the range angle θ2 is large.

For example, in FIG. 10A, the directivity processing unit 37 performs the directivity processing using the sound data collected by eight microphones 11 among sixteen microphones 11 included in the array microphones 10. On the other hand, for example, in FIG. 10B, the directivity processing unit 37 performs the directivity processing using the sound data collected by four microphones 11 among sixteen microphones 11 included in the array microphones 10.

The directivity processing unit 37 may perform the directivity processing in accordance with a position of a sound source (a monitoring-target person or an abnormal noise, for example) estimated by the sound source estimation unit 40. The directivity processing unit 37 may obtain information on the sound source estimation position from the sound source estimation unit 40 multiple times and change (switch, for example) the direction of the directivity every time the information is obtained. With such a configuration, it is possible to track and monitor the position of the sound source even when the sound source moves. That is, directivity is directed to the estimated position of the sound source in tracking the sound source position.

The detection unit 39 obtains a sound data item subjected to the directivity processing by the directivity processing unit 37. The sound data includes first sound data in which a sound component in a direction and a range of first directivity is emphasized and second sound data in which a sound component in a direction and a range of second directivity is emphasized, for example. The detection unit 39 detects monitoring-target sound (an example of predetermined sound) from the obtained sound data item. That is, the detection unit 39 has a function as a sound detection unit. In this embodiment, emphasizing a sound component indicates, for example, extracting a sound only in a particular direction and range by filtering process by use of array microphones formed by a plurality of microphones.

In addition, the detection unit 39 performs various types of processing when the monitoring-target sound is detected. A detailed description of the detection unit 39 will be provided later. The detection unit 39 is an example of the processing unit which performs predetermined processing when monitoring-target sound is detected.

The sound source estimation unit 40 obtains the sound data from the sound decoder 36 and estimates a position of the sound source generating the monitoring-target sound, which is detected by the detection unit 39. The sound source broadly includes a person speaking, a person who produces sound, a specific person (a male or a female), a physical object (an emergency vehicle, for example), a generation source of abnormal sound (emergency bell or siren, for example), a generation source of a specific environmental sound, and other sound sources. The sound source estimation unit 40 is an example of an estimation unit.

The sound source estimation unit 40 estimates a position of a sound source by a known sound source estimation technique, for example. The sound source position estimation result by the sound source estimation unit 40 is used for tracking abnormal sound or switching directivity performed by the directivity processing unit 37, for example.

The sound source estimation unit 40 may output the sound source position estimation result to the image output unit 33 or the sound output unit 42, for example. The operator 60 can easily realize the position of the sound source by the image output unit 33 or the sound output unit 42 presenting the sound source position estimation result.

The sound output unit 42 converts the sound data from the sound output unit 37 from digital sound data into analog sound data, amplifies the sound data, and provides the sound data to the speaker 63.

The speaker 63 outputs sound corresponding to the sound data from the sound output unit 42. Accordingly, the operator 60 can hear the sound, which is obtained by processing the sound data collected by the array microphones 10, through the speaker 63. The speaker 63 is an example of the informing unit.

The data recording unit 43 may include a Hard Disk Drive (HDD) or a Solid State Drive (SSD) and sequentially records the sound data or the image data of the plurality of channels obtained by the network processing unit 31. In a case that the data recording unit 43 records sound data and image data, a sound data generation time and an image data generation time are recorded in association with each other. In addition, information on the generation time may be recorded along with the sound data or the image data. The data recording unit 43 may be provided inside the monitoring control apparatus 30, or otherwise provided outside the monitoring control apparatus 30 as an external storage medium.

In addition, the data recording unit 43 records information on a search tag for searching the recorded sound data or the image data, for example. The search tags recorded in the data recording unit 43 is appropriately referred to by other components in the monitoring control apparatus 30.

Next, a detailed description of the detection unit 39 will be given.

When the signal level of the sound data subjected to the directivity processing is equal to or greater than a first predetermined threshold value or equal to or less than a second predetermined threshold value, for example, the detection unit 39 detects the sound data as monitoring-target sound. Information on the threshold value to be compared with the signal level of the sound data is maintained in a memory, which is not shown in the drawing, for example. The case where the signal level of the sound data is equal to or less than the second predetermined threshold value includes a case where a machine produces an operation sound, then stops and does not produce any operation sound, for example.

The detection unit 39 detects, as the monitoring-target sound, abnormal sound included in the sound data subjected to the directivity processing, for example. Abnormal sound patterns are stored in the memory, which is not shown in the drawing, for example, and the detection unit 39 detects the abnormal sound when an abnormal sound pattern is included in the sound data.

The detection unit 39 detects a predetermined keyword included in the sound data subjected to the directivity processing as monitoring-target sound, for example. Information on a keyword is stored in the memory which is not shown in the drawing, for example, and the detection unit 39 detects a keyword when the keyword recorded in the memory is included in the sound data. In addition, a known sound recognition technique may be used, for example, for detecting a keyword. In such a case, the detection unit 39 has a known sound recognition function.

In addition, the monitoring-target sound may be set in advance. For example, the detection unit 39 may set at least one sound with a signal level which is equal to or greater than a first predetermined threshold value or equal to or less than a second predetermined value, abnormal sound, and a keyword as the monitoring-target sound. The setting information is stored in the memory, which is not shown in the drawing, for example.

When the aforementioned monitoring-target sound is detected, the detection unit 39 sends the information that the monitoring-target sound has been detected (detection information) to at least one of the image output unit 33 and the sound output unit 42. The detection information includes warning information (alarm) indicating that the abnormal sound, the sound with the signal level which is equal to or greater than the first predetermined threshold value or equal to or less than the second predetermined threshold value, or the predetermined keyword, has been detected.

In addition, when the monitoring-target sound is detected, the detection unit 39 sends predetermined information to the data recording unit 43. When the monitoring-target sound is detected, the detection unit 39 may send the information on the search tag, for example, to the data recording unit 43 and causes the data recording unit 43 to maintain the information on the search tag. The search tag is a tag for searching the sound data including the monitoring-target sound or the image data corresponding to the sound data from the data recording unit 43.

The search tag may be recorded in the data recording unit 43 at the same timing as at which the sound data or the image data obtained in real time is recorded, for example. In addition, the search tag may be associated and recorded, in the data recording unit 43, with the sound data or the image data which have already been recorded in the data recording unit 43.

The image decoder 32 or the sound decoder 36 searches and obtains data which coincides with or corresponds to the search tag among the sound data or the image data recorded in the data recording unit 43 by the operator 60 inputting information which coincides with or corresponds to the search tag via the touch panel 62, for example. Accordingly, it is possible to shorten a search time even in a case where the sound data or the image data is recorded for a long time, for example.

In addition, the operator 60 may select a specific search tag through the touch panel 62, for example, from a list in which a plurality of search tags are listed in a time series manner. In such a case, the operator 60 may select specific search tags in an order from the oldest search tag or from the latest search tag based on the generation time. In addition, the operator 60 may select, as a specific search tag, a search tag generated at a time corresponding to a time counted by a time counting unit (not shown) through the touch panel 62, for example. The image decoder 32 or the sound decoder 36 searches and obtains data which coincides with or corresponds to the aforementioned specific search tag in the sound data or the image data recorded in the data recording unit 43. The list is recorded in the data recording unit 43, for example.

The search tag includes information on a time at which the monitoring-target sound is detected by the detection unit 39, for example. The search tag includes information on a direction (a direction of directivity) of the sound source which generates the monitoring-target sound, for example. The search tag includes information on a size of a range (a size of a range of directivity) including an area of the sound source which generates the monitoring-target sound, for example. The search tag includes information on a type (abnormal sound, sound including a keyword, sound with a signal level which is equal to or greater than the predetermined threshold value or equal to or less than the threshold value) of the monitoring-target sound, for example. The type of the sound is determined by the detection unit 39 by using the known sound recognition technique, for example.

The search tag includes information on whether or not the sound source of the monitoring-target sound moves, which is detected by the VMD function, or information on a direction of the motion, for example. The sound source, for which detection of whether or not the sound source moves has been done, is included in the image data captured by the camera 20 at a generation time or in a generation time zone of the aforementioned monitoring-target sound, for example. The information detected by the VMD function is sent from the image recognition unit 34 to the detection unit 39 every time motion is detected, for example.

The search tag includes information on a type of the sound source of the monitoring-target sound, which is recognized through an image by the image recognition unit 34. The image data, for which the type of the sound source is recognized, is image data captured by the camera 20 at the generation time or in the generation time zone of the monitoring-target sound, for example. The information on the type of the sound source is sent from the image recognition unit 34 to the detection unit 39.

The search tag includes a thumbnail image (stationary image), for example. The thumbnail image corresponds to at least a part of the image data captured by the camera 20 at the generation time or in the generation time zone of the monitoring-target sound, for example. The thumbnail image is sent from the image recognition unit 34 to the detection unit 39.

When the monitoring-target sound is detected, the detection unit 39 may start recording the sound data or the image data received by the network processing unit 31. For example, the network processing unit 31 temporarily accumulates the sound data or the image data for a predetermined period (thirty seconds, for example), and if the monitoring-target sound is not detected by the detection unit 39, the network processing unit 31 then abandons the temporarily accumulated sound data or image data. When the monitoring-target sound is detected, the detection unit 39 provides an instruction to the network processing unit 31 and controls the data recording unit 43 to record the sound data or the image data including the temporarily accumulated sound data or image data (referred to as sound prerecording or image prerecording). In addition, the data recording unit 43 records the sound data or the image data from the network processing unit 31. The sound prerecording or the image prerecording may be completed after elapse of a predetermined time.

When a predetermined keyword is detected as the monitoring-target sound, the detection unit 39 may delete the sound data including the keyword without recording the sound data in the data recording unit 43. Alternatively, when the predetermined keyword is detected as the monitoring-target sound, the detection unit 39 may delete a part corresponding to the keyword from the sound data or replace the part corresponding to the keyword with sound other than the keyword. The detection unit 39 may record the sound data, in which the part corresponding to the keyword is deleted or replaced, in the data recording unit 43. With such a configuration, it is possible to protect confidential information or privacy when the keyword is information to be kept confidential. Such processing in relation to deletion or replacement of a keyword is also referred to as "keyword processing". Alternatively, the keyword processing may be performed on the sound data which has already been recorded in the data recording unit 43.

When the monitoring-target sound is detected, the detection unit 39 may instruct the directivity processing unit 37 to switch at least one of a direction of the directivity and a size of a range of the directivity. In such a case, the directivity processing unit 37 may switch the direction of the directivity to a predetermined direction, or may switch the size of the range of the directivity to a predetermined size.

For example, information on a plurality of locations (a location A and a location B) included in a range in which the camera 20 can capture an image is registered in advance in the memory, which is not shown in the drawing. When the monitoring-target sound is detected in a direction of the location A, the directivity processing unit 37 may switch the direction of the directivity from the direction of the location A to a direction of a location (the location B, for example) other than the location A.

For example, information on a plurality of ranges (a range A and a range B) included in a range in which the camera 20 can capture an image is registered in advance in a memory, which is not shown in the drawing. When the monitoring-target sound is detected in the range A, the directivity processing unit 37 may switch the size of the range of the directivity from the size of the range A to a size of a range (the range B, for example) other than the range A.

When a predetermined keyword is detected as the monitoring-target sound, the detection unit 39 may record the sound data including the keyword in the data recording unit 43. The recording may include sound prerecording and image prerecording. With such a configuration, the operator 60 can start recording by using the keyword as a trigger by registering the keyword to be monitored in advance, and it is possible to improve monitoring accuracy.

Next, a description will be given of an arrangement state of the array microphones 10, the camera 20, and the respective sound sources.

Figure 3:
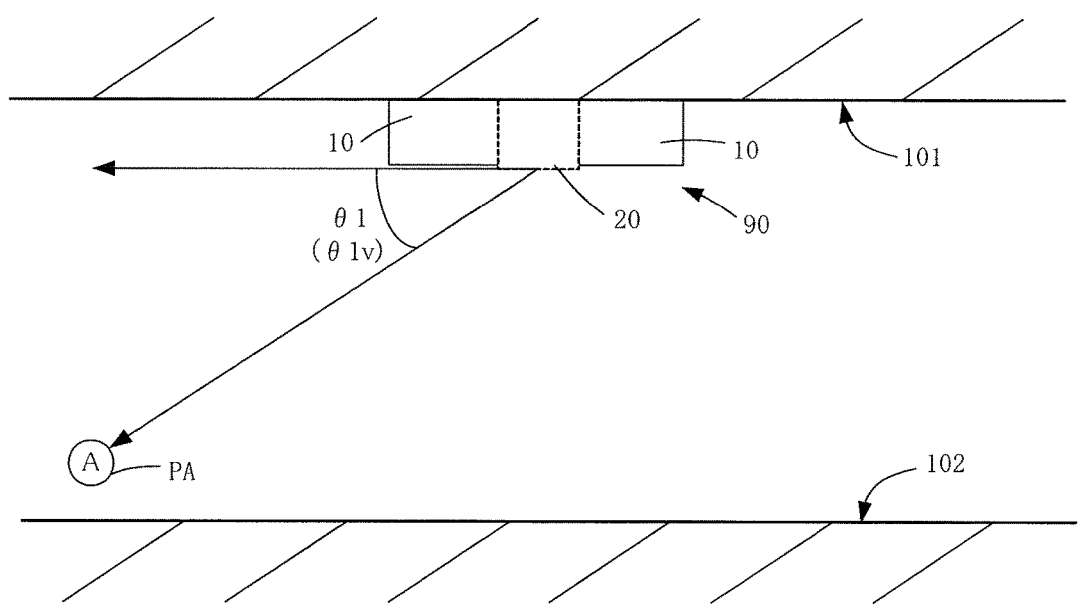
FIG. 3 is a planar view showing an example of an arrangement state of array microphones, a camera, and the respective sound sources according to the first embodiment.

FIG. 3 is a diagram schematically showing an example of the arrangement state of the array microphones 10, the camera 20, and the respective sound sources.

In FIG. 3, the sound collection unit 90 is fixed to a ceiling surface 101 in a room, for example. In FIG. 3, the plurality of microphones 11A to 11C included in the array microphones 10 are aligned along the ceiling surface 101 (the installation surface of the sound collection unit 90). The reference sign PA represents a sound source.

In addition, the sound collection unit 90 is attached to the ceiling surface 101 such that a reference direction of the array microphones 10 and a reference direction (the optical axis direction, for example) of the camera 20 coincide with each other. A horizontal direction and a vertical direction with respect to the reference direction of the array microphones 10 coincide with a horizontal direction and a vertical direction with respect to the reference direction of the camera 20. The horizontal direction corresponds to an x-axis direction and a y-axis direction, and the vertical direction corresponds to a z-axis direction.

The reference direction of the array microphones 10 is an alignment direction in which the respective microphones 11 in the array microphones 10 are aligned, for example. The sound collection angle $\theta 1$ is an angle formed by the reference direction and the directivity of the array microphones 10. A horizontal component of the sound collection angle 81 formed by the reference direction and the directivity of the array microphones 10 is a horizontal angle $\theta 1h$. A vertical component of the sound collection angle $\theta 1$ formed by the reference direction and the vertical direction of the directivity of the array microphones 10 is a vertical angle $81v$.

Since the respective microphones 11 in the array microphones 10 are aligned on the circular circumference at the predetermined interval in the sound collection unit 90, frequency properties of the sound data are the same in any direction with respect to the horizontal direction along the alignment surface (x-y surface). Accordingly, the sound collection angle $\theta 1$ substantially depends on the vertical angle $\theta 1v$ in the example in FIG. 3. Therefore, the following description will be mainly given without taking the horizontal angle $\theta 1h$ into consideration as the sound collection angle $\theta 1$.

As shown in FIG. 3, the sound collection angle $\theta 1$ (vertical angle $\theta 1v$) of the array microphones 10 in the sound collection unit 90 is an angle between directions (the x axis and the y axis) which are parallel to the alignment surface of the microphones 11A to 11C and a direction in which directivity sensitivity is maximized.

The microphones 11A to 11C collect sound which reaches the microphones 11A to 11C. In addition, the camera 20 images the circumference of the camera 20, for example, all directions from the camera 20 by using a direction immediately below the camera 20 (z-axis direction) as a reference direction (optical axis direction).

In addition, the sound collection target by the array microphones 10 or the imaging target by the camera 20 may be limited to a partial direction instead of all directions. In addition, the array microphones 10 or the monitoring control apparatus 30 may synthesize the sound data collected in a state where the sound collection target is limited to the partial direction and generate the same sound data as sound data which is generated when the sound collection target covers all directions. In addition, the camera 20 or the monitoring control apparatus 30 may synthesize an image signal captured in a state where the imaging target is limited to the partial direction and generate the same image signal as an image signal which is generated when the imaging target covers all directions.

When the reference direction of the array microphones 10 does not coincide with the reference direction of the camera 20, for example, the horizontal angle θ1h may be taken into consideration. In such a case, the directivity is formed in accordance with a three-dimensional (x, y, z) position or direction, for example, in consideration of the horizontal angle θ1h and the vertical angle θ1v.

Next, a description will be given of an operation example of the monitoring control apparatus 30.

Figure 4:
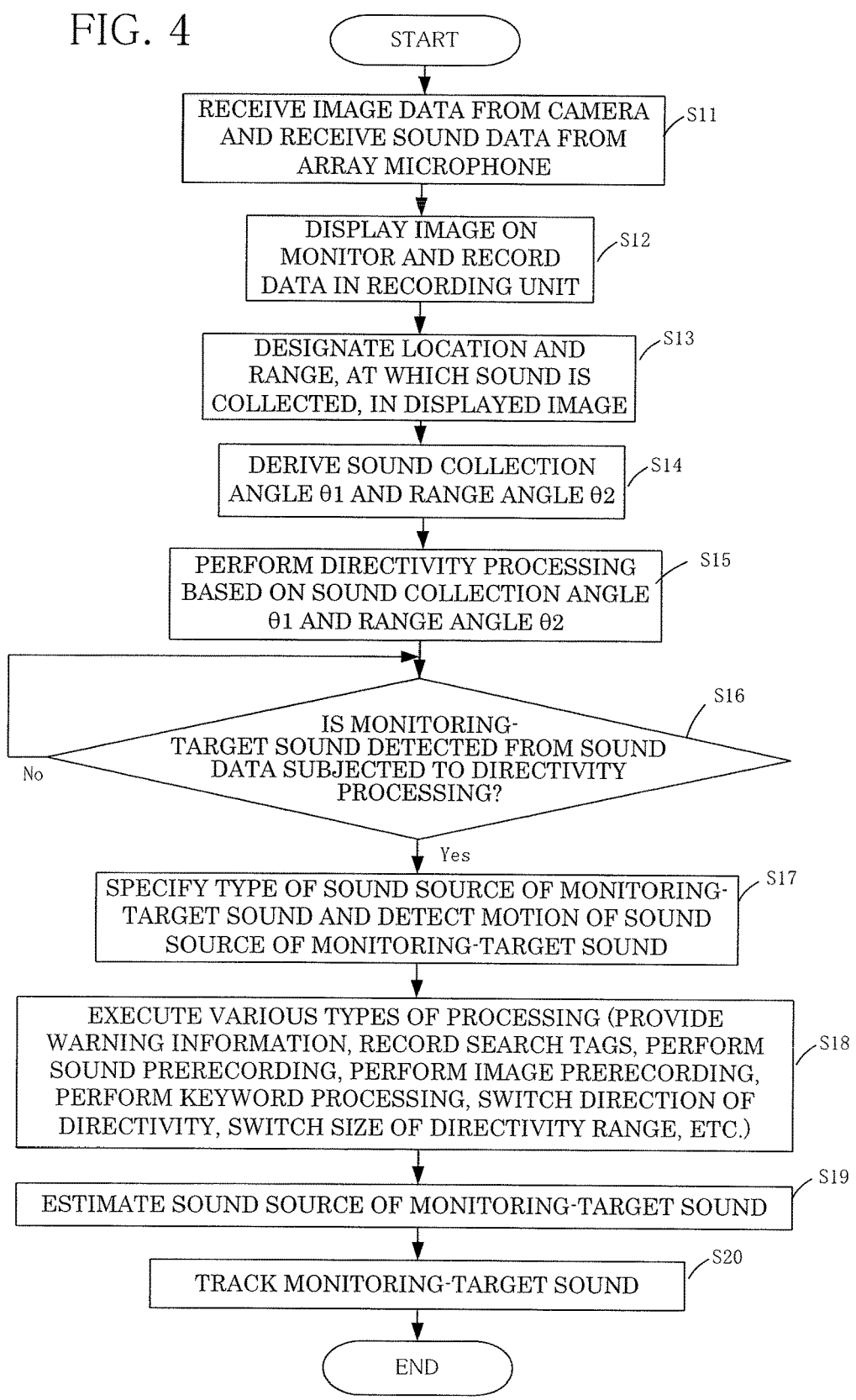
FIG. 4 is a flowchart showing an operation example of a monitoring control apparatus according to the first embodiment.

FIG. 4 is a flowchart illustrating an operation example of the monitoring control apparatus 30.

FIG. 4 shows an example of a real time operation. The real time operation is an operation when the operator 60 monitors sound data collected by the array microphones 10 and an image captured by the camera 20, for example, in real time by using the monitoring control apparatus 30.

First, the network processing unit 31 receives the image data sent from the camera 20 via the network 50 in FIG. 4. In addition, the network processing unit 31 receives sound data of a plurality of channels sent from the array microphones 10 via the network 50 (S11).

The image data received by the network processing unit 31 is decoded by the image decoder 32 and is sent to the image output unit 33. The image output unit 33 outputs the decoded image data to the monitor 61 and controls the monitor 61 to display the image (S12). In addition, the network processing unit 31 may record the image data and the sound data in the data recording unit 43.

Subsequently, the sound collection coordinate designation unit 35 receives a coordinate input from the touch panel 62, for example (S13). The range designation unit 44 receives the sound collection range based on the coordinate input from the touch panel 62, for example, and derives the size of the sound collection range. For example, the operator 60 visually recognizes a display position of the image being displayed on the monitor 61 and designates an image range and an image range to be focused by operating the touch panel 62. Either of the designation of the image position or the designation of the image range may be performed first.

The sound collection coordinate designation unit 35 derives sound collection coordinates corresponding to the designated image range (image position). The range designation unit 44 derives the size of the sound collection range corresponding to the designated image range. The operator 60 touches positions of specific persons (the reference sign P1 in FIG. 1, for example) included in the image being displayed on the monitor 61, and designates the size of the range (the size of the area P1 in FIG. 1, for example) by pinch-in operation or pinch-out operation, for example. Then, the sound collection coordinate designation unit 35 obtains a sound collection coordinate and a range coordinate. The image range is an example of a monitoring region to be monitored by the observer, for example.

The sound collection coordinate designation unit 35 may obtain a coordinate, at which a predetermined pattern is present, as a sound collection coordinate by recognition of a predetermined pattern from the image by the image recognition unit 34 instead of the designation of the position of the image range by the operator 60.

The range designation unit 44 may obtain information on a size of a range, in which a predetermined pattern is present, as information on a size of a sound collection range by recognition of a predetermined pattern from the image by the image recognition unit 34 instead of the designation of the size of the image range by the operator 60.

The sound collection angle calculating unit 38 derives the sound collection angles θ1 by referring to the conversion table or performing known arithmetic processing, for example, based on the sound collection coordinates obtained by the sound collection coordinate designation unit 35 (S14).

The range angle calculating unit 45 derives the range angle θ2 by referring to the conversion table or performing known arithmetic processing, for example, based on the size of the sound collection range obtained by the range designation unit 44 (S14).

The derived sound collection angle θ1 and the derived range angle θ2 are input to the directivity processing unit 37. The directivity processing unit 37 derives a parameter for the directivity processing of the array microphones 10 in accordance with the sound collection angle θ1 and the range angle θ2. Then, the directivity processing unit 37 performs the directivity processing on the sound data from the sound decoder 36 by using the derived parameter (S15). With such an operation, sound collecting sensitivity of the array microphones 10 is maximized with respect to the direction of the sound collection angle θ1 and the range having the size corresponding to the range angle θ2, for example, for the sound data output by the directivity processing unit 37.

Then, the detection unit 39 detects a monitoring-target sound (the abnormal sound, the predetermined keyword, or the sound with the signal level which is equal to or greater than the first predetermined threshold value or equal to or less than the second predetermined threshold value, for example) from the sound data subjected to the directivity processing (S16). A stand-by state is maintained in S16 until the monitoring-target sound is detected.

Then, the image recognition unit 34 may recognize, through the image, image data including a sound source of the detected monitoring-target sound and specify a type (a person, a male, a female, a physical object, or another sound source, for example) of the sound source of the monitoring-target sound (S17). With such an operation, the operator 60 can easily determine whether to perform monitoring depending on the type of the sound source, and therefore, it is possible to reduce the burden on the operator 60 and to improve the monitoring accuracy.

The image recognition unit 34 may detect the motion of the sound source of the monitoring-target sound by using the VMD function, for example (S17). With such an operation, the operator can easily focus on the motion of the sound source, and therefore, it is possible to reduce the burden on the operator 60 and to improve the monitoring accuracy.

The image recognition unit 34 may send the result of the image recognition (information on the type of the sound source of the monitoring-target sound or information on the motion of the sound source of the monitoring-target sound, for example) to the detection unit 39.

In addition, the processing in S17 may be omitted. For example, the user may set information on whether to omit the processing in S17 via the touch panel 62, for example, or a control unit, which is not shown in the drawing, may perform the setting in accordance with a monitoring level. The information on whether to omit the processing in S17 is maintained in the memory, which is not shown in the drawing, for example.

Subsequently, the monitoring control apparatus 30 performs predetermined processing (action) in accordance with at least one of the detection results by the detection unit 39 and the image recognition result by the image recognition unit 34 (S18).

When the monitoring-target sound is detected, when the type of the sound source is specified, or when the motion of the sound source is detected, that is, when a monitoring trigger occurs, for example, the detection unit 39 may instruct the image output unit 33 to provide warning information through an image. In addition, when the monitoring trigger occurs, the detection unit 39 may instruct the sound output unit 42 to provide warning information by sound (S18). In addition, the detection unit 39 may cause the sound output unit 42 or the image output unit 33 to produce different types of warning sounds or to display different types of warning information in accordance with the type of the monitoring trigger. With such a configuration, the operator 60 of the monitoring control apparatus 30 can easily recognize generation and the like of the monitoring-target sound, and it is possible to reduce the burden on the operator 60 and to improve the monitoring accuracy.

When the monitoring trigger occurs, for example, the detection unit 39 may record information on the search tag in the data recording unit 43 (S18). With such a configuration, the operator 60 can easily search desired sound data or a specific location of the sound data even when the operator 60 checks the sound data or the image data again in the future and to shorten a verification time, for example.

When the monitoring trigger occurs, for example, the detection unit 39 may instruct the network processing unit 31 to perform at least one of the sound prerecording and the image prerecording (S18). With such a configuration, it is possible to improve usage efficiency of the data recording unit 43 without recording sound or image in the data recording unit 43 before the monitoring trigger occurs. In addition, it is possible to reliably record the sound data or the image data at the timing of the occurrence of the monitoring trigger when the monitoring trigger occurs and to check the sound data or the image data as a verification material, for example, in the future.

When a predetermined keyword is detected as monitoring-target sound, for example, the detection unit 39 may perform the keyword processing (S18). When the keyword is confidential information, it is possible to protect the confidential information in this configuration. In addition, when sound data including the keyword is recorded while the keyword is deleted or replaced, it is possible to save the sound data while the confidential information is protected.

When the monitoring trigger occurs, for example, the detection unit 39 may instruct the directivity processing unit 37 to switch the direction of the directivity (S18). With such a configuration, it is possible to improve the possibility in that the monitoring-target sound can be tracked when the sound source is expected to move, by changing the direction of the directivity to direct a preset direction, for example.

When the monitoring trigger occurs, for example, the detection unit 39 may instruct the directivity processing unit 37 to switch the size of the range of the directivity (S18). With such a configuration, it is possible to improve the possibility in that the monitoring-target sound can be tracked when the sound source is expected to move, by changing the size of the range of the directivity to direct a preset size of range, for example. For example, even when a distance is changed between the camera 20 and a sound source due to the change in size of the range of the directivity, it is possible to improve the tracking accuracy for the monitoring-target sound.

Subsequently, the sound source estimation unit 40 estimates a position of the sound source of the monitoring-target sound (S19). With such a configuration, it is possible to improve the monitoring accuracy by the operator 60.

Subsequently, the directivity processing unit 37 obtains information on the position of the sound source of the monitoring-target sound, which is estimated by the sound source estimation unit 40, at a predetermined timing (every predetermined time, for example) and switches the direction of the directivity such that the directivity is directed to the position of the sound source (S20). With such a configuration, it is possible to track the sound source of the monitoring-target sound, the operator 60 can easily monitor movement of the sound source, and it is possible to improve the monitoring accuracy.

S19 and S20 may be omitted.

According to the operation example in FIG. 4, the operator 60 can monitor an image and sound in the current monitoring region via the monitor 61 and the speaker 63. Particularly, the operator 60 can monitor monitoring-target sound and an image including the sound source of the monitoring-target sound. In addition, the operator 60 can designate an arbitrary monitoring region as a monitoring target while checking the image. The designation of the monitoring region includes, for example, designation of a position or a size of a range of the monitoring region. In addition, usage of the sound data and the image data is enhanced, and it is possible to improve convenience by performing various types of processing in response to the detection of the monitoring-target sound.

Next, a detailed description will be given of the directivity processing by the monitoring system 100.

Figure 5:
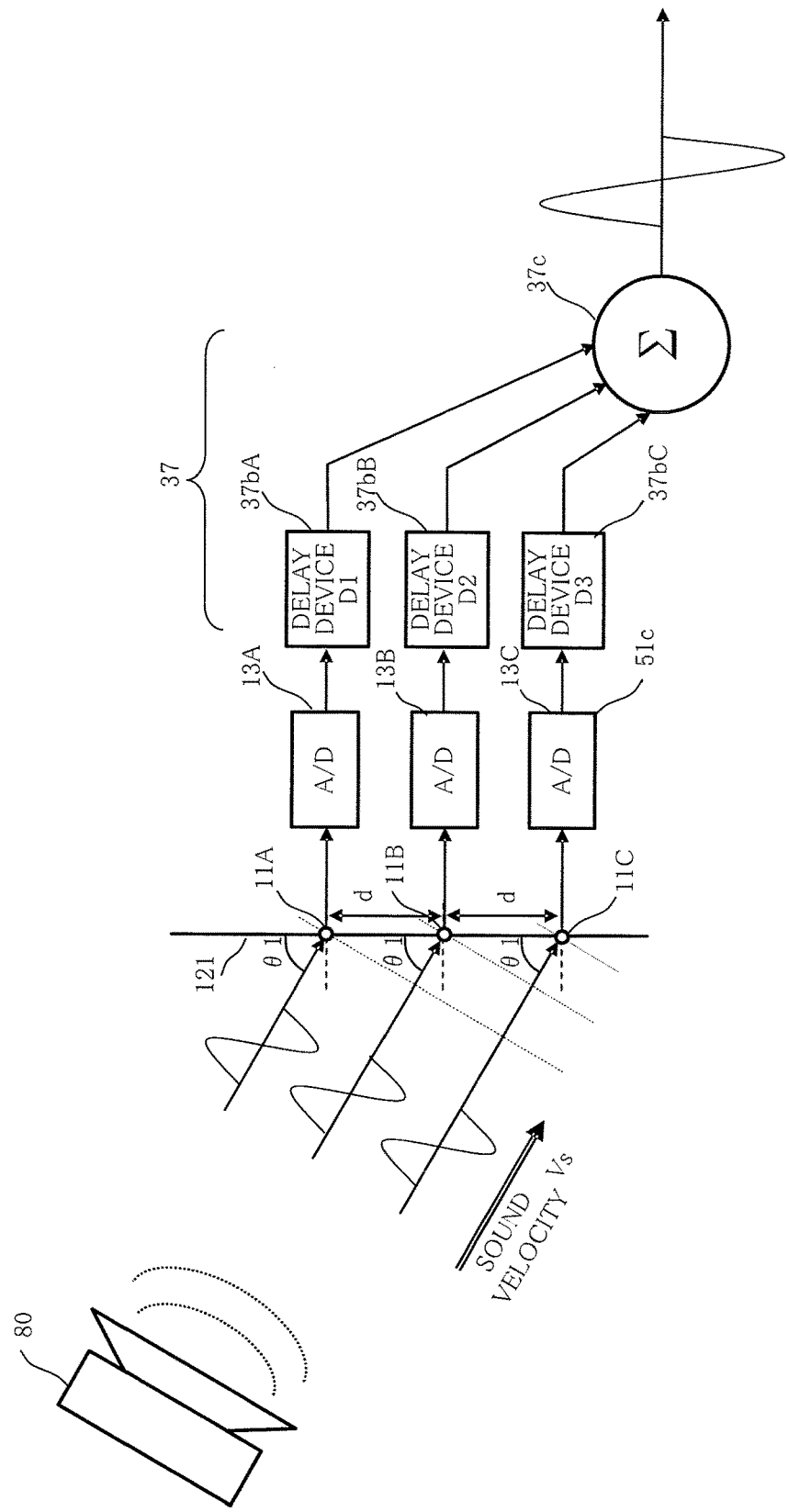
FIG. 5 is an outline diagram of directivity processing according to the first embodiment.

FIG. 5 is a diagram schematically showing a basic configuration example in relation to the directivity processing. In FIG. 5, the directivity processing unit 37 includes a plurality of delay devices 37*b*A, 37*b*B, and 37*b*C and an adder 37*c*, and the directivity may be formed by the processing by the delay devices 37*b*A, 37*b*B, and 37*b*C and the adder 37*c*.

The A/D converters 13A, 13B, and 13C convert analog sound data output from the microphones 11A to 11C into digital sound data, and the directivity processing unit 37 performs the directivity processing on the digital sound data after the conversion. The number (n) of the microphones included in the array microphones 10, the number (n) of the A/D converters, and the number (n) of the delay devices included in the directivity processing unit 37 are increased or decreased as necessary.

Since the plurality of microphones 11A to 11C are arranged at positions at which the microphones 11A to 11C are separate from each other at a predetermined distance in FIG. 5, a relative time difference (arrival time difference) occurs in a time until a sound wave generated by one sound source 80 reaches the respective microphones 11A to 11C. The sound source 80 is a sound source of the monitoring-target sound, for example.

Due to an influence of the aforementioned arrival time difference, there is a case where a signal level is attenuated by addition of a plurality of sound data items with phase differences if the sound data respectively detected by the plurality of microphones 11A to 11C is added as it is. Thus, time delay is given to each of the plurality of sound data items by the delay devices 37*b*A to 37*b*C to adjust the phases, and the sound data with the adjusted phases is added by the adder 37*c*. With such a configuration, the plurality of sound data items with the same phase is added, and the signal level increases.

In FIG. 5, the arrival time difference varies in accordance with an arrival direction (corresponding to the sound collection angle θ1) of the sound wave which is incident from the sound source 80 to case body incident surface 121 of the array microphones 10. When the plurality of microphones 11A to 11C detect the sound wave which has arrived from a specific direction (θ1), for example, the phases of the plurality of sound data items input to the adder 37c coincide with each other, and the signal level of the sound data output from the adder 37c increases. In contrast, a phase difference occurs in the plurality of sound data items input to the adder 37c in the case of a sound wave which has arrived from a direction other than the specific direction (θ1), and the signal level of the sound data output from the adder 37c is attenuated. Accordingly, it is possible to form the directivity of the array microphones 10 such that sensitivity thereof increases with respect to the sound wave which has arrived from the specific direction (θ1).

When the sound wave of the monitoring-target sound reaches the case body incident surface 121 from the direction of the sound collection angle θ1, the respective delay times D1, D2, and D3 represented by (Equation 1) are allocated as delay times of the respective delay devices 37bA, 37bB, and 37bC.

$$D1 = L1/Vs = d(n-1)\cos θ1/Vs$$

$$D2 = L2/Vs = d(n-2)\cos θ1/Vs$$

$$D3 = L3/Vs = d(n-3)\cos θ1/Vs \qquad \text{(Equation 1)}$$

where

L1: a difference between sound wave arrival distances of the first microphone and the n-th microphone (a known constant value), L2: a difference between sound wave arrival distances of the second microphone and the n-th microphone (a known constant value), L3: a difference between sound wave arrival distances of the third microphone and the n-th microphone (a known constant value), Vs: a sound velocity (a known constant value), and d: an arrangement interval of the microphones (a known constant value).

As examples, n=3 in the case of the system configuration shown in FIG. 2, and n=16 in the case of the sound collection unit 90 shown in FIG. 1.

When the directivity is matched with the sound wave which reaches the array microphones 10 from the specific direction θ1 as shown by (Equation 1), the delay times D1 to D3 are allocated to the respective delay devices 37bA, 37bB, and 37bC in accordance with the arrival time difference of the sound wave which is incident to the respective microphones 11A to 11C at the case body incident surface 121.

For example, the directivity processing unit 37 obtains the respective delay times D1 to D3 based on the sound collection angle θ1 from the sound collection angle calculating unit 38 and (Equation 1) and allocates the delay times D1 to D3 to the respective delay devices 37bA to 37bC. With such a configuration, it is possible to form the directivity of the array microphones 10 while emphasizing the sound data of the sound wave which reaches the case body incident surface 121 from the direction of the sound collection angle θ1.

The allocated delay times D1 to D3 and the known constant values in (Equation 1) are stored in the memory, which is not shown in the drawing, in the monitoring control apparatus 30.

According to the monitoring system 100, it is possible to receive designation of a monitoring region in image data received in real time, for example, from the operator 60 of the monitoring control apparatus 30 and to monitor whether or not there is an error in a state where the directivity is oriented to a direction and a range corresponding to the monitoring region. When a monitoring trigger occurs, it is possible to promote usage of the sound data collected by the array microphones 10 and the image data captured by the camera 20 by the monitoring control apparatus 30 performing various types of processing and to improve the convenience of the operator 60.

Second Embodiment

In a second embodiment, it is assumed that a monitoring system includes a recorder for recording sound data or image data as a separate device from a monitoring control apparatus.

Figure 6:
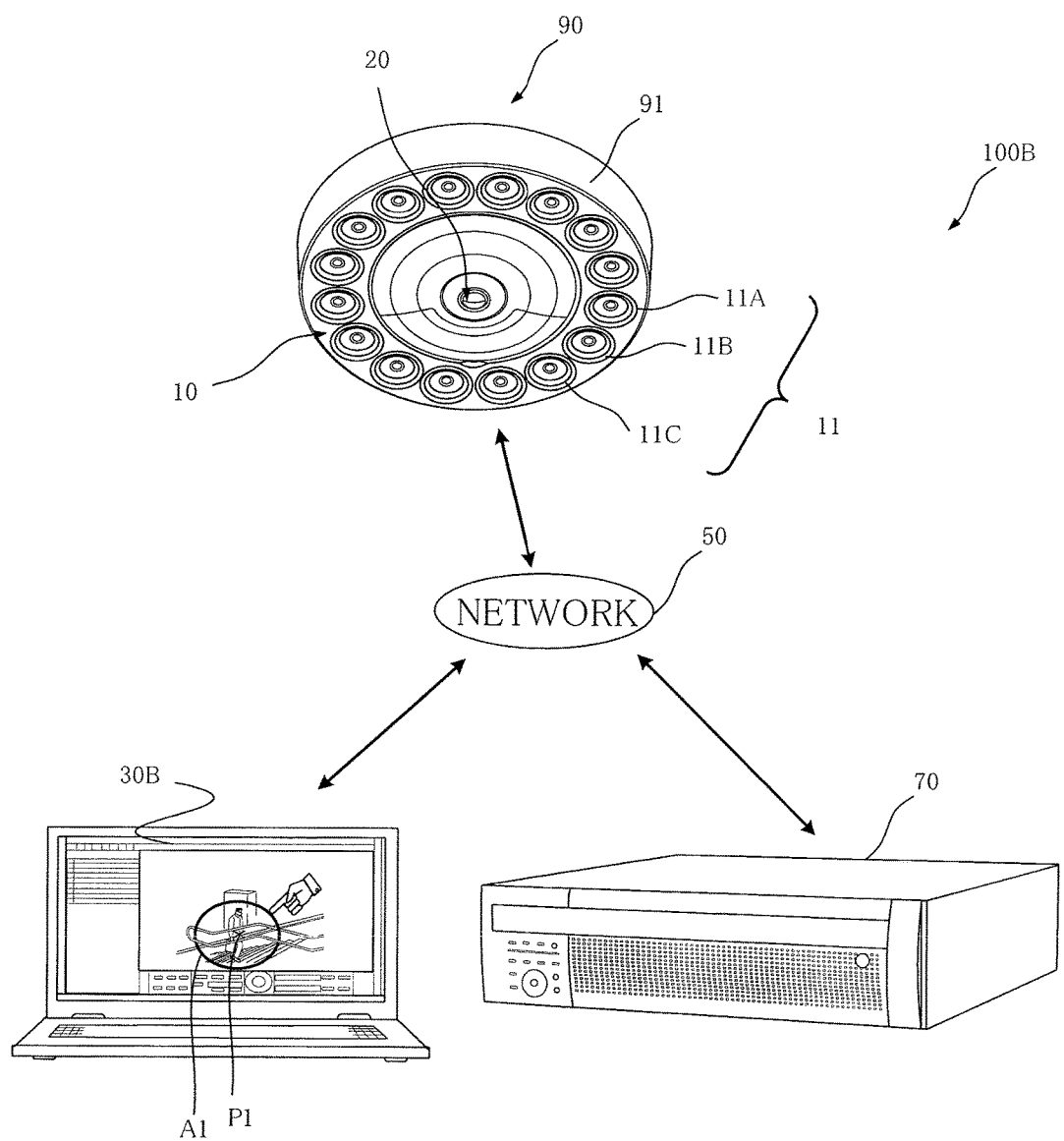
FIG. 6 is an outline diagram of a monitoring system according to a second embodiment.

FIG. 6 is an outline diagram of a monitoring system 100B according to this embodiment. In comparison between FIG. 6 and FIG. 1, FIG. 6 is different in that the monitoring system 100B is provided with a recorder 70. The recorder 70 is connected to the network 50. The recorder 70 is an example of the storage device. The recorder 70 stores sound data collected by the array microphones 10 and image data captured by the camera 20, for example.

Figure 7:
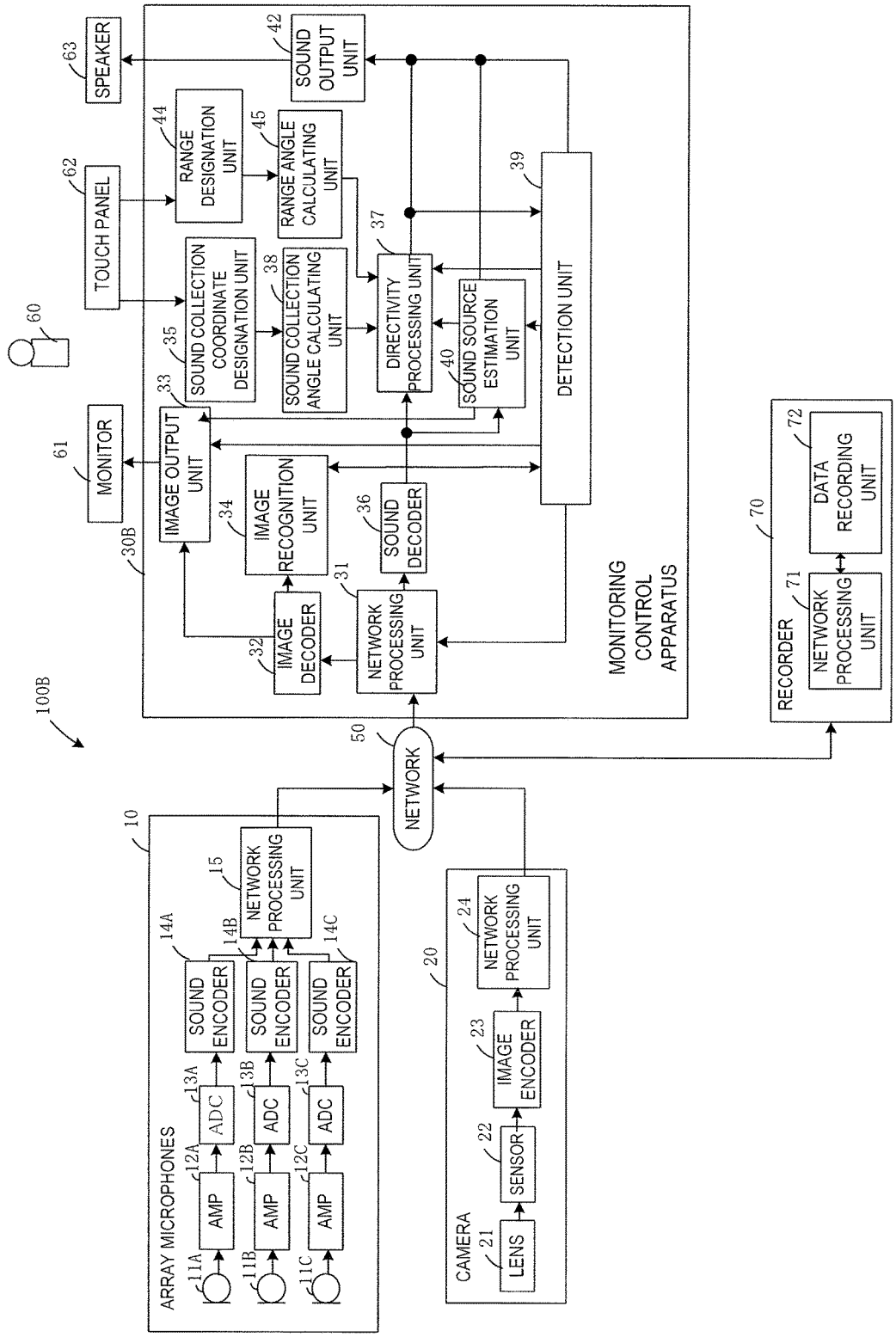
FIG. 7 is a block diagram showing a configuration example of the monitoring system according to the second embodiment.

FIG. 7 is a block diagram showing a configuration example of the monitoring system 100B. In the monitoring system 100B in FIG. 7, the same reference signs will be given to the same configurations as those in the monitoring system 100 shown in FIG. 2, and descriptions thereof will be omitted or simply provided.

The monitoring system 100B is provided with the array microphones 10, the camera 20, a monitoring control apparatus 30B, and the recorder 70.

In comparison with the monitoring control apparatus 30 shown in FIG. 2, the monitoring control apparatus 30B is not provided with the data recording unit 43. The monitoring control apparatus 30B accesses a data recording unit 72 provided in the recorder 70, records data therein, or reads the data from the data recording unit 72 instead of recording the data in the data recording unit 43 or reading the data from the data recording unit 43. When data is communicated between the monitoring control apparatus 30B and the recorder 70, the data is communicated via the network processing unit 31 of the monitoring control apparatus 30B, the network 50, and a network processing unit 71 of the recorder 70.

The recorder 70 is provided with the network processing unit 71 and the data recording unit 72. The recorder 70 includes a CPU, DSP, ROM, or RAM, for example, and executes various functions by causing the CPU or the DSP to execute a control program recorded in the ROM or the RAM.

The network processing unit 71 obtains sound data of a plurality of channels sent from the array microphones 10 or image data sent from the camera 20, for example, via the network 50. The network processing unit 71 sends the sound data or the image data recorded in the data recording unit 72, for example, to the network 50.

The data recording unit 72 has the same configuration and function as those of the data recording unit 43 in the monitoring control apparatus 30 shown in FIG. 2. In addition, the data recording unit 72 records the same data (sound data, image data, and information on a search tag, for example) as the data recorded in the data recording unit 43.

When the network processing unit 71 receives sound data, image data, and information on a search tag from the monitoring control apparatus 30B, for example, the data recording unit 72 may record the received data in association with each other. In addition, when the network processing unit 71 receives the information on the search tag from the monitoring control apparatus 30B and the sound data or the image data has already been recorded in the data recording unit 72, the data recording unit 72 may record the information on the search tag in association with the sound data or the image data.

In addition, the sound data, the image data, and the information on the search tag recorded in the data recording unit 72 are read from the data recording unit 72 in response to execution of a predetermined order by the CPU, for example, and are sent to the monitoring control apparatus 30B via the network processing unit 71 and the network 50.

When predetermined information is received from the monitoring control apparatus 30B via the network 50, for example, the data recording unit 72 determines whether or not the information recorded as the search tag coincides with or corresponds to the received predetermined information. When it is determined that both the information recorded as the search tag and the received predetermined information coincide with each other, the data recording unit 72 searches sound data or image data associated with the search tag and sends the searched sound data or image data to the network 50.

By using the search tag recorded in the recorder 70 as described above, it is possible to easily search sound data or image data recorded in the past, to shorten the search time, and to improve the convenience of the operator 60.

Next, a description will be given of an operation example of the monitoring control apparatus 30B.

Figure 8:
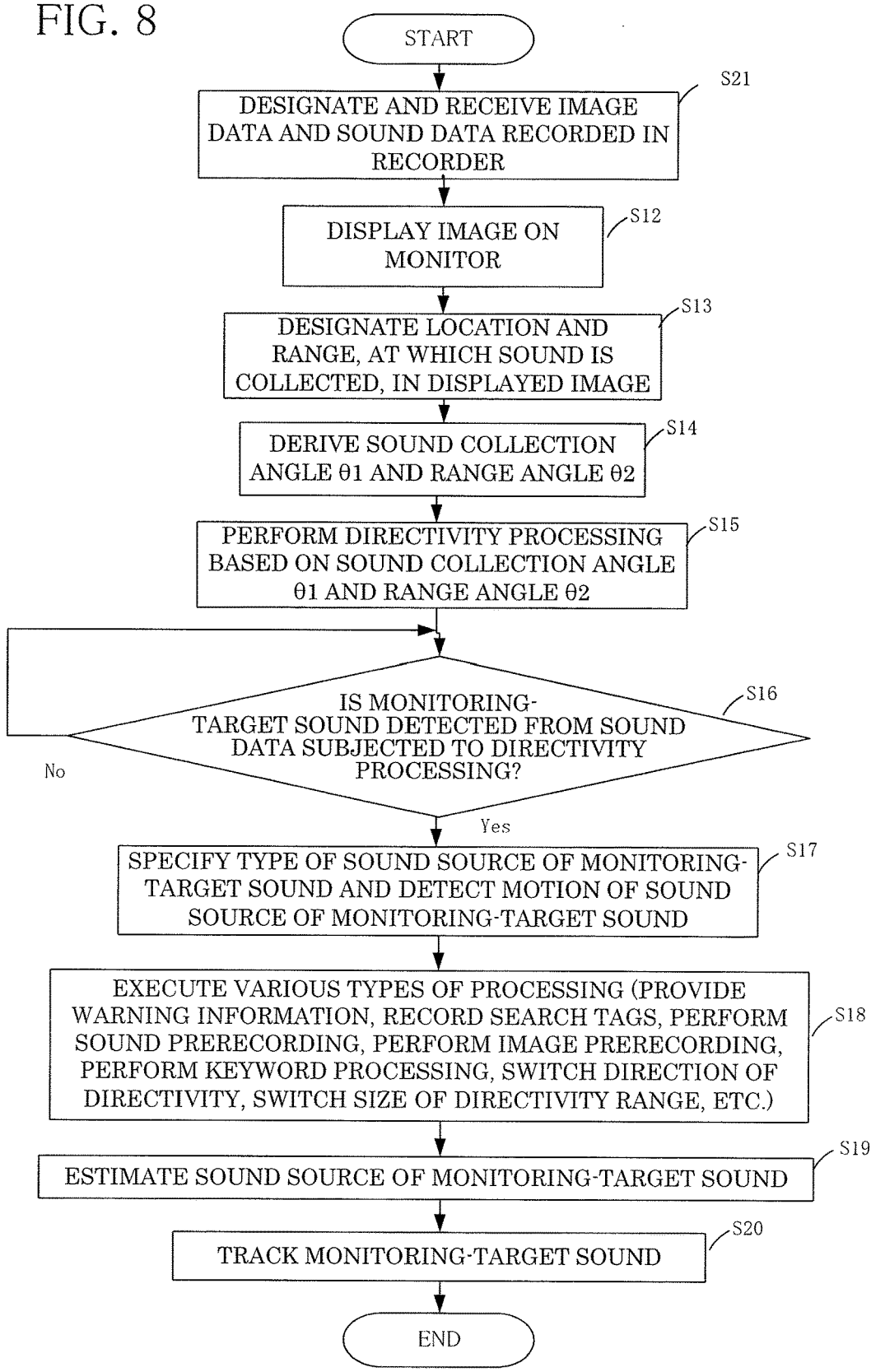
FIG. 8 is a flowchart showing an operation example of a monitoring control apparatus according to the second embodiment.

FIG. 8 is a flowchart showing the operation example of the monitoring control apparatus 30B.

FIG. 8 shows an example of an operation of reproducing an output of the recorder. The example of the operation of reproducing an output of the recorder relates to an operation when the operator 60 analyzes sound data and an image signal in the past which are recorded in the recorder 70 by using the monitoring control apparatus 30B. In FIG. 8, the same step numbers will be given to steps in which the same processing as that in FIG. 4 is performed, and descriptions thereof will be omitted or simply provided.

When the image data captured by the camera 20 or the sound data of the plurality of channels collected by the array microphones 10 in the past are recorded in the recorder 70, it is possible to read the recorded image data and the sound data from the recorder 70 in the monitoring system 100B.

The monitoring control apparatus 30B instructs the recorder 70 to read specific image data and the sound data recorded in the recorder 70 in response to an input operation from the operator 60, for example. In such a case, the specific image data and the sound data is read from the recorder 70 and is received by the network processing unit 31 via the network 50 (S21).

Subsequently, the processing in S12 to S20 in FIG. 8 is performed. In addition, the processing in S17, S19, and S20 may be omitted.

In the operation example in FIG. 8, the operator 60 can monitor an image and sound in a monitoring region in the past at the same time via the monitor 61 and the speaker 63. Particularly, the operator 60 can monitor monitoring-target sound and an image including a sound source of the monitoring-target sound. In addition, the operator 60 can designate an arbitrary monitoring region as a monitoring target while checking the image. The designation of the monitoring region includes, for example, designation of a position or a size of a range of the monitoring region. In addition, it is possible to enhance usage of the sound data and the image data by performing various types of processing in accordance with the detection of the monitoring-target sound and to improve the convenience.

In addition, it is possible to perform a quick search when data relating to the monitoring-target sound is searched later, for example, by recording the search tag in association with the recorded image data or the sound data. As described above, it is possible to enhance usage of the sound data and the image data by performing various types of processing in accordance with the detection of the monitoring-target sound and to improve convenience.

In addition, the example of the operation of reproducing an output of the recorder in FIG. 8 can be applied to an operation of dealing with data recorded in the data recording unit 43 in the first embodiment.

According to the monitoring system 100B, it is possible to receive designation of a monitoring region in image data recorded in the past, for example, from the operator 60 of the monitoring control apparatus 30B and to monitor whether or not there is an error in a state where the directivity is oriented to a direction and a range corresponding to the monitoring region. When a monitoring trigger occurs, it is possible to promote usage of the sound data collected by the array microphones 10 and the image data captured by the camera 20 by the monitoring control apparatus 30B performing various types of processing and to improve the convenience of the operator 60.

In addition, the present invention is not limited to the configurations in the aforementioned embodiments and can be applied to any configuration as long as it is possible to achieve functions described in claims or functions of the configurations in these embodiments.

For example, the array microphones 10 or the camera 20 may be provided with a part of the components, which relate to sound processing, in the monitoring control apparatuses 30 and 30B in the above embodiments. The array microphones 10 may include a part or an entirety of the image recognition unit 34, the sound collection coordinate designation unit 35, the range designation unit 44, the sound collection angle calculating unit 38, the range angle calculating unit 45, the directivity processing unit 37, the detection unit 39, and the sound source estimation unit 40, for example. With such a configuration, it is possible to reduce processing burden on the monitoring control apparatuses 30 and 30B. In this case, when the array microphones 10 includes a part of the components which relate to the sound processing, necessary data is appropriately communicated between the monitoring control apparatus 30 or 30B and the array microphones 10 via the network 50.

Although the example of the array microphones 10 in which the plurality of microphones 11 are arranged on a circular circumference at a predetermined interval is described in the aforementioned embodiments, for example, the respective microphones 11 may be aligned in a different manner. For example, the respective microphones 11 may be aligned in a line along a single direction (the x-axis direction, for example) at a predetermined interval. In addition, the respective microphones 11 may be arranged in a cross shape along two directions (the x-axis direction and the y-axis direction, for example) at a predetermined interval. In addition, the respective microphones 11 may be arranged on two circular circumferences with different diameters at a predetermined interval.

For example, the monitoring control apparatuses 30 and 30B may associate a direction of an actual spatial monitoring range and the sound collection angle $\theta1$ of the array microphones 10 without using the camera 20 and perform presetting in the aforementioned embodiments. That is, memories, which are not shown in the drawing, in the monitoring control apparatuses 30 and 30B may hold correspondence information between direction of the monitoring range and the sound collection angle $\theta1$. In such a case, if a user designates a monitoring range via the touch panel 62 or the like, for example, the sound collection angle calculating unit 38 may derive a sound collection angle $\theta1$ with reference to the correspondence information maintained in the memories. In addition, the user may directly designate the sound collection angle $\theta1$ via the touch panel 62 or the like, and the designated data may be dealt with as data derived by the sound collection angle calculating unit 38, for example. With such a configuration, it is possible to determine a direction of the directivity without using the camera 20.

For example, the monitoring control apparatuses 30 and 30B may associate a size of an actual spatial monitoring range and the range angle $\theta2$ of the array microphones 10 without using the camera 20 and perform presetting in the aforementioned embodiments. That is, memories, which are not shown in the drawing, in the monitoring control apparatuses 30 and 30B may hold correspondence information between size of the monitoring range and the range angle $\theta2$. In such a case, if a user designates a size of a monitoring range via the touch panel 62 or the like, for example, the range angle calculating unit 45 may derive a range angle $\theta2$ with reference to the correspondence information maintained in the memories. In addition, the user may directly designate the range angle $\theta2$ via the touch panel 62 or the like, and the designated data may be dealt with as data derived by the range angle calculating unit 45, for example. With such a configuration, it is possible to determine a size of a range of the directivity without using the camera 20.

For example, the monitoring systems 100 and 100B may be systems which perform monitoring by using sound instead of images in the aforementioned embodiments. In such a case, the camera 20 or the components for realizing functions relating to display may be omitted in the monitoring systems 100 and 100B, for example.

Although an example in which the sound collection unit 90 is fixed to the ceiling surface 101 in the room is described in the aforementioned embodiments, for example, the sound collection unit 90 may be fixed to another position (a wall surface in a room, for example). In addition, the monitoring systems 100 and 100B may be provided with a plurality of cameras 20. Moreover, the monitor 61, the touch panel 62, and the speaker 63 may be included in each of the monitoring control apparatuses 30 and 30B.

For example, a software keyboard (on-screen keyboard) for adjusting a volume may be displayed on the monitor 61 in the aforementioned embodiments. By operating the software keyboard on the touch panel 62, it is possible to adjust the volume of the sound data subjected to the directivity processing, for example.

For example, a control unit, which is not shown in the drawings, may correct distortion of the sound data which occurs in accordance with an environment where the sound collection unit 90 is installed, in each of the monitoring control apparatuses 30 and 30B in the aforementioned embodiments. In addition, the control unit, which is not shown in the drawings, may correct distortion occurring in the image data captured by the camera 20 (a camera including a fisheye lens, for example).

When a monitoring region is touched by the touch panel 62 to orient the directivity to the monitoring region and then the monitoring region is touched again by the touch panel 62, for example, the sound collection coordinate designation unit 35 may exclude the monitoring region from the monitoring targets in the aforementioned embodiments. That is, when the same position or the same region in the image data being displayed on the monitor 61 is touched multiple times, the sound collection coordinate designation unit 35 may stop deriving the sound collection coordinates and complete the directivity processing by the directivity processing unit 37.

When the sound collection coordinate designation unit 35 receives a dragging operation in a state where a monitoring region is touched by the touch panel 62, for example, the monitoring region may be moved in the aforementioned embodiments.

Each of the monitoring systems 100 and 100B may be provided with a plurality of sound collection units 90 in the aforementioned embodiments. In such a case, the respective sound collection units 90 may cooperate to form image data and sound data. In addition, images captured by the cameras 20 in the respective sound collection units 90 may be displayed on split screens on the monitor 61 at the same time. The monitoring control apparatuses 30 and 30B may perform the directivity processing by using sound data collected by the respective sound collection units 90 even in a case where a dragging operation across a plurality of split screens is received in the respective split screens by the touch panel 62.

In the above embodiment, the sound collection coordinate designation unit 35 may designate a plurality of sound collection coordinates at the same time. The range designation unit 44 may designate a plurality of sound collection ranges at the same time. In those cases, it may be configured that the sound collection angle calculating unit 38 calculates a plurality of sound collection angles $\theta1$, the range angle calculating unit 45 calculates a plurality of range angles $\theta2$, and the directivity processing unit 37 generates a plurality of sound data in which sound components in a plurality of directions and a plurality of ranges are emphasized.

Summary of Aspects of the Present Invention

A sound processing apparatus according to an aspect of the present invention includes: a data obtaining unit, configured to obtain sound data and image data, wherein the sound data is collected from a sound source in a given area by a sound collection unit including a plurality of microphones and the image data is captured by an imaging unit which captures an image at least partially in the given area; a first designation unit, configured to designate a direction defined relative to the sound collection unit, wherein the designated direction corresponds to a designation part on an image displayed based on the image data; a second designation unit, configured to designate an arbitrary range in the given area, wherein the designated arbitrary range corresponds to a designation part on the image displayed based on the image data; and a directivity processing unit, configured to emphasize a sound component in the sound data in the direction designated by the first designation unit within the arbitrary range designated by the second designation unit.

The sound processing apparatus according to the aspect of the present invention may be configured by further including: a sound detection unit, configured to detect a predetermined sound from the sound component in the direction and the arbitrary range emphasized by the directivity processing unit; and a processing unit, configured to perform predetermined processing in response to a detection of the predetermined sound by the sound detection unit.

The sound processing apparatus according to the aspect of the present invention may be configured so that the processing unit is configured to cause a recording unit which records the sound data and the image data to record one or more search tags in response to the detection of the predetermined sound, wherein the one or more search tags are prepared for searching sound data including the predetermined sound or image data including a sound source of the predetermined sound from the recording unit.

The sound processing apparatus according to the aspect of the present invention may be configured so that the processing unit is configured to obtain sound data or image data recorded in the recording unit which corresponds to a given search tag included in the one or more search tags recorded in the recording unit.

The sound processing apparatus according to the aspect of the present invention may be configured so that each of the one or more search tags includes at least one information item from among a type of the predetermined sound, a direction of the sound source of the predetermined sound defined relative to the sound collection unit, a size of the arbitrary range which contains an area of the sound source of the predetermined sound, and a time at which the sound detection unit detects the predetermined sound.

The sound processing apparatus according to the aspect of the present invention may be configured so that the processing unit is configured to cause an informing unit to provide warning information including a fact that the predetermined sound has been detected in response to the detection of the predetermined sound.

The sound processing apparatus according to the aspect of the present invention may be configured so that the processing unit is configured to cause a recording unit to record sound data including the predetermined sound in response to the detection of the predetermined sound.

The sound processing apparatus according to the aspect of the present invention may be configured so that the processing unit is configured to change at least one of the direction and a size of the arbitrary range in which the sound component is emphasized by the directivity processing unit in response to the detection of the predetermined sound.

The sound processing apparatus according to the aspect of the present invention may be configured by further including an estimation unit, configured to estimate a position of a sound source which generates the predetermined sound and to cause an informing unit to provide information on the estimated position.

The sound processing apparatus according to the aspect of the present invention may be configured by including an estimation unit, configured to estimate a position of the sound source which generates the predetermined sound, wherein the directivity processing unit is configured to emphasize a sound component which arrives from a direction of the position of the sound source estimated by the estimation unit.

The sound processing apparatus according to the aspect of the present invention may be configured so that the sound detection unit is configured to detect a sound component emphasized by the directivity processing unit having a signal level being equal to or greater than a first predetermined signal level or equal to or less than a second predetermined signal level, as the predetermined sound.

The sound processing apparatus according to the aspect of the present invention may be configured so that the sound detection unit is configured to detect a predetermined keyword from at least one of the sound components emphasized by the directivity processing unit, as the predetermined sound.

The sound processing apparatus according to the aspect of the present invention may be configured so that the processing unit is configured to process a part of sound data which includes the detected predetermined keyword, wherein the processed part corresponds to the predetermined keyword.

The sound processing apparatus according to the aspect of the present invention may be configured so that the processing unit is configured to cause a recording unit to record sound data including the detected predetermined keyword.

The sound processing apparatus according to the aspect of the present invention may be configured so that the sound detection unit is configured to detect a predetermined abnormal sound included in at least one of the sound components emphasized by the directivity processing unit, as the predetermined sound.

The sound processing apparatus according to the aspect of the present invention may be configured by further including an image recognition unit, configured to perform image recognition on the image data, wherein the processing unit is configured to perform the predetermined processing in accordance with an image recognition result by the image recognition unit.

The sound processing apparatus according to the aspect of the present invention may be configured so that the image recognition unit is configured to recognize a type of the sound source of the predetermined sound in the image data.

The sound processing apparatus according to the aspect of the present invention may be configured so that the image recognition unit is configured to recognize whether the sound source of the predetermined sound in the image data moves.

The sound processing apparatus according to the aspect of the present invention may be configured so that the processing unit is configured to cause a recording unit which records the sound data and the image data to record one or more search tags in response to the image recognition on the image data, wherein the one or more search tags are prepared for searching sound data including the predetermined sound or image data including a sound source of the predetermined sound from the recording unit.

The sound processing apparatus according to the aspect of the present invention may be configured so that the processing unit is configured to obtain sound data or image data recorded in the recording unit which corresponds to a given search tag included in the one or more search tags recorded in the recording unit.

The sound processing apparatus according to the aspect of the present invention may be configured so that each of the one or more search tags includes at least one from among a type of the sound source, information on whether the sound source moves, and a thumbnail image including the sound source.

The sound processing apparatus according to the aspect of the present invention may be configured so that the processing unit is configured to cause an informing unit to provide warning information including a fact that the predetermined sound has been detected in accordance with the image recognition result by the image recognition unit in response to the detection of the predetermined sound.

The sound processing apparatus according to the aspect of the present invention may be configured so that the processing unit is configured to cause a recording unit to record sound data including the predetermined sound in accordance with the image recognition result by the image recognition unit in response to the detection of the predetermined sound.

The sound processing apparatus according to the aspect of the present invention may be configured so that the processing unit is configured to change at least one of the direction and a size of the arbitrary range in which the sound component is emphasized by the directivity processing unit in accordance with the image recognition result by the image recognition unit in response to the detection of the predetermined sound.

A sound processing system according to aspect of the present invention includes: a sound collection apparatus which includes a sound collection unit configured to collect sound from a sound source in a given area by using a plurality of microphones; an imaging apparatus which includes an imaging unit configured to capture image at least partially in the given area; and a sound processing apparatus, configured to process sound data collected by the sound collection unit, wherein the sound processing apparatus includes: a data obtaining unit, configured to obtain the sound data collected by the sound collection unit and image data captured by the imaging unit; a first designation unit, configured to designate a direction defined relative to the sound collection unit, wherein the designated direction corresponds to a designation part on an image displayed based on the image data; a second designation unit, configured to designate an arbitrary range in the given area, wherein the designated arbitrary range corresponds to a designation part on the image displayed based on the image data; and a directivity processing unit, configured to emphasize a sound component in the sound data in the direction designated by the first designation unit within the arbitrary range designated by the second designation unit.

The sound processing system according to the aspect of the present invention may be configured so that the sound processing apparatus further includes: a sound detection unit, configured to detect a predetermined sound from the sound component in the direction and the arbitrary range emphasized by the directivity processing unit; and a processing unit, configured to perform predetermined processing in response to a detection of the predetermined sound by the sound detection unit.

The sound processing system according to the aspect of the present invention may be configured so that the data obtaining unit is configured to obtain the sound data from the sound collection apparatus and obtain the image data from the imaging apparatus, and the sound processing apparatus includes a recording unit configured to record the sound data, the image data, and one or more search tags for searching sound data including the predetermined sound.

The sound processing apparatus according to the aspect of the present invention may be configured by further including a recording apparatus configured to record data, wherein the recording apparatus includes a recording unit configured to record the sound data collected by the sound collection unit and the image data captured by the imaging unit in association with each other and record one or more search tags for searching the sound data including the predetermined sound, and the data obtaining unit is configured to obtain the sound data, the image data and the search tags from the recording unit.

A sound processing method according to an aspect of the present invention includes: obtaining sound data and image data, wherein the sound data is collected from a sound source in a given area by a sound collection unit including a plurality of microphones and the image data is captured by an imaging unit which captures an image at least partially in the given area; designating a direction defined relative to the sound collection unit, wherein the designated direction corresponds to a designation part on an image displayed based on the image data; designating an arbitrary range in the given area, wherein the designated arbitrary range corresponds to a designation part on the image displayed based on the image data; and emphasizing a sound component in the sound data in the designated direction within the designated arbitrary range.

The present invention is effective for a sound processing apparatus, a sound processing system, a sound processing method, and the like capable of promoting usage of sound data and image data and improving convenience.

What is claimed is:
1. A sound processing system comprising:
   a sound collector configured to collect sound from a sound source in a given area by using a plurality of microphones;
   an imager configured to capture an image at least partially in the given area; and
   a sound processing apparatus, configured to process sound data collected by the sound collector,
   wherein the sound processing apparatus includes:
      a data receiver configured to obtain the sound data collected by the sound collector and image data captured by the imager;
      a first designator configured to determine a direction of a directivity of the sound collector, the direction being defined relative to the sound collector, and corresponding to a position designated by an interaction of an operator with an image displayed based on the image data;
      a directivity processor configured to form the directivity of the sound collector in the determined direction to emphasize a sound component of the sound data in the direction determined by the first designator within the range of the directivity of the sound collector,
   a detector that detects a predetermined sound from the emphasized sound component in the determined direction of the directivity of the sound collector; and
   a processor that performs a predetermined processing in response to a detection of the predetermined sound;
   wherein the predetermined processing includes recording at least one search tag in a recorder, which records the sound data and the image data, in association with the sound data or the image data, in response to the detection of the predetermined sound, wherein the at least one search tag includes a size of a range of directivity of the predetermined sound and is provided for subsequent searching of sound data, including a sound source of the predetermined sound from the recorder.

2. A sound processing method comprising:
   obtaining sound data and image data, wherein the sound data is collected from a sound source in a given area by a sound collector, including a plurality of microphones, and the image data is captured by an imager, which captures an image at least partially in the given area;
   determining a direction of a directivity of the sound collector, the direction being defined relative to the sound collector, and corresponding to a position designated by an interaction of an operator with an image displayed based on the image data;

forming the directivity of the sound collector in the determined direction to emphasize a sound component of the sound data in the determined direction within the range of the directivity of the sound collector;

detecting a predetermined sound from the emphasized sound component in the determined direction of the directivity of the sound collector; and performing predetermined processing in response to a detection of the predetermined sound;

wherein the predetermined processing includes recording at least one search tag in a recorder, which records the sound data and the image data, in association with the sound data or the image data, in response to the detection of the predetermined sound, wherein the at least one search tag includes a size of a range of directivity of the predetermined sound and is provided for subsequent searching of sound data, including a sound source of the predetermined sound from the recorder.

3. The sound processing method according to claim 2, further comprising:

obtaining sound data or image data, recorded in the recorder, which corresponds to a given search tag included in the at least one search tag recorded in the recorder.

4. The sound processing method according to claim 2, wherein each of the at least one search tag includes at least one information item, including a type of the predetermined sound, a direction of the sound source of the predetermined sound defined relative to the sound collector, and a time at which the sound detector detects the predetermined sound.

5. The sound processing method according to claim 2, wherein the predetermined operation provides warning information, indicating that the predetermined sound has been detected, in response to the detection of the predetermined sound.

6. The sound processing method according to claim 2, wherein the predetermined operation causes a recorder to record sound data, including the predetermined sound, in response to the detection of the predetermined sound.

7. The sound processing method according to claim 2, wherein the predetermined operation changes at least one of the direction and the size of the range of the directivity of the sound collector, in which the sound component is emphasized, in response to the detection of the predetermined sound.

8. The sound processing method according to claim 2, further comprising:

estimating a position of a sound source that generates the predetermined sound and providing information on the estimated position.

9. The sound processing method according to claim 2, further comprising:

estimating a position of the sound source that generates the predetermined sound, wherein the directivity of the sound collector is formed to emphasize a sound component which arrives from a direction of the estimated position of the sound source.

10. The sound processing method according to claim 2, wherein in the detecting of the predetermined sound, the emphasized sound component having a signal level equal to or greater than a first predetermined signal level or equal to or less than a second predetermined signal level, is detected as the predetermined sound.

11. The sound processing method according to claim 2, wherein in the detecting of the predetermined sound, a predetermined keyword is detected as the predetermined sound, from the emphasized sound component.

12. The sound processing method according to claim 11, wherein the predetermined processing processes a part of sound data which includes the detected predetermined keyword, the processed part corresponding to the predetermined keyword.

13. The sound processing method according to claim 11, wherein the predetermined processing causes a recorder to record sound data including the detected predetermined keyword.

14. The sound processing method according to claim 2, wherein in the detecting of the predetermined sound, a predetermined abnormal sound included in the emphasized sound component is detected as the predetermined sound.

15. The sound processing method according to claim 2, further comprising:

performing image recognition on the image data, wherein the predetermined processing is performed in accordance with a result the image recognition.

16. The sound processing method according to claim 15, wherein the image recognition recognizes a type of the sound source of the predetermined sound in the image data.

17. The sound processing method according to claim 15, wherein the image recognition recognizes whether the sound source of the predetermined sound in the image data moves.

18. The sound processing method according to claim 15, wherein the predetermined processing causes a recorder, which records the sound data and the image data, to record at least one search tag in response to the image recognition performed on the image data.

19. The sound processing method according to claim 18, wherein the predetermined processing obtains sound data or image data recorded in the recorder which corresponds to a given search tag included in the at least one search tag recorded in the recorder.

20. The sound processing method according to claim 18, wherein each of the at least one search tag includes at least one of a type of the sound source, information on whether the sound source moves, and a thumbnail image including the sound source.

21. The sound processing method according to claim 15, wherein the predetermined processing provides warning information, indicating that the predetermined sound has been detected, in accordance with the image recognition result in response to the detection of the predetermined sound.

22. The sound processing method according to claim 15, wherein the predetermined processing causes a recorder to record sound data including the predetermined sound in accordance with the image recognition result in response to the detection of the predetermined sound.

23. The sound processing method according to claim 15, wherein the predetermined processing changes at least one of the direction and the size of the range of the directivity of the sound collector, in which the sound component is emphasized in accordance with the image recognition result in response to the detection of the predetermined sound.

24. The sound processing method according to claim 2, wherein the range is designated by a pinch-in or pinch-out operation of the operator on the image displayed based on the image data.

25. The sound processing method according to claim 2, wherein the range is designated as a circle or an ellipse on the image displayed based on the image data.

26. The sound processing method according to claim 2, wherein the range is designated as a polygon on the image displayed based on the image data.

27. A non-transitory computer readable storage medium in which a program is stored, the program causing a computer to execute operations of:

obtaining sound data and image data, wherein the sound data is collected from a sound source in a given area by a sound collector, including a plurality of microphones, and the image data is captured by an imager, which captures an image at least partially in the given area;

determining a direction of a directivity of the sound collector, the direction being defined relative to the sound collector, and corresponding to a position designated by an interaction of an operator with an image displayed based on the image data;

forming the directivity of the sound collector in the determined direction to emphasize a sound component of the sound data in the determined direction within the range of the directivity of the sound collector;

detecting a predetermined sound from the emphasized sound component in the determined direction of the directivity of the sound collector; and performing predetermined processing in response to a detection of the predetermined sound;

wherein the predetermined processing includes recording at least one search tag in a recorder, which records the sound data and the image data, in association with the sound data or the image data, in response to the detection of the predetermined sound, wherein the at least one search tag includes a size of a range of directivity of the predetermined sound and is provided for subsequent searching of sound data, including a sound source of the predetermined sound from the recorder.

* * * * *